(12) United States Patent
Karjala et al.

(10) Patent No.: US 10,836,852 B2
(45) Date of Patent: Nov. 17, 2020

(54) ETHYLENE-BASED POLYMERS WITH IMPROVED OPTICS

(71) Applicant: Dow Global Technologies LLC, Midland, MI (US)

(72) Inventors: Teresa P. Karjala, Lake Jackson, TX (US); Lori L. Kardos, Freeport, TX (US); David T. Gillespie, Lake Jackson, TX (US); Zachary L. Polk, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/495,636

(22) PCT Filed: Mar. 19, 2018

(86) PCT No.: PCT/US2018/023057
§ 371 (c)(1),
(2) Date: Sep. 19, 2019

(87) PCT Pub. No.: WO2018/175277
PCT Pub. Date: Sep. 27, 2018

(65) Prior Publication Data
US 2020/0109223 A1    Apr. 9, 2020

Related U.S. Application Data

(60) Provisional application No. 62/474,134, filed on Mar. 21, 2017.

(51) Int. Cl.
*C08F 10/02* (2006.01)
*C08L 23/04* (2006.01)
(Continued)

(52) U.S. Cl.
CPC .............. *C08F 210/16* (2013.01); *C08J 5/18* (2013.01); *C08L 23/0815* (2013.01);
(Continued)

(58) Field of Classification Search
None
See application file for complete search history.

(56) References Cited

U.S. PATENT DOCUMENTS

| | | | |
|---|---|---|---|
| 8,415,442 B2 | 4/2013 | Karjala et al. | |
| 8,822,601 B2 | 9/2014 | Karjala et al. | |

(Continued)

FOREIGN PATENT DOCUMENTS

| | | | |
|---|---|---|---|
| WO | 2017146981 A1 | 8/2017 | |
| WO | 2017189299 A1 | 11/2017 | |

(Continued)

OTHER PUBLICATIONS

International Search Report and Written Opinion pertaining to PCT/US2018/023057, dated Jun. 25, 2018.

(Continued)

*Primary Examiner* — Richard A Huhn
(74) *Attorney, Agent, or Firm* — Dinsmore & Shohl LLP

(57) ABSTRACT

A composition comprising an ethylene-based polymer, wherein the ethylene-based polymer comprises the following properties: a) an Mw(abs) from 130,000 to 162,000 g/mol; b) a melt index (I2) from 1.5 to 3.0 g/10 min; c) an ADF LS from 0.350 to 0.450 for molecular weight ≥500,000 g/mol.

10 Claims, 3 Drawing Sheets

(51) Int. Cl.
  *C08L 23/06* (2006.01)
  *C08F 210/16* (2006.01)
  *C08J 5/18* (2006.01)
  *C08L 23/08* (2006.01)
  *C08F 110/02* (2006.01)

(52) U.S. Cl.
  CPC ............ *C08F 10/02* (2013.01); *C08F 110/02* (2013.01); *C08F 2500/00* (2013.01); *C08F 2500/12* (2013.01); *C08J 2323/08* (2013.01); *C08L 23/04* (2013.01); *C08L 23/06* (2013.01); *C08L 2203/16* (2013.01); *C08L 2205/025* (2013.01); *C08L 2207/066* (2013.01)

(56) References Cited

U.S. PATENT DOCUMENTS

| | | | |
|---|---|---|---|
| 8,871,887 | B2 | 10/2014 | Karjala et al. |
| 8,916,667 | B2 | 12/2014 | Karjala et al. |
| 9,068,032 | B2 | 6/2015 | Karjala et al. |
| 9,228,036 | B2 | 1/2016 | Berbee et al. |
| 9,243,087 | B2 | 1/2016 | Karjala et al. |
| 9,303,107 | B2 | 4/2016 | Karjala et al. |
| 2014/0094583 | A1 | 4/2014 | Karjala et al. |
| 2014/0316094 | A1 | 10/2014 | Berbee et al. |
| 2014/0316096 | A1* | 10/2014 | Berbee ............ C09D 123/0815 526/352.2 |
| 2016/0083568 | A1 | 3/2016 | den Doelder et al. |
| 2016/0137822 | A1* | 5/2016 | den Doelder ........... B32B 27/08 428/516 |
| 2017/0073439 | A1 | 3/2017 | Ewart et al. |

FOREIGN PATENT DOCUMENTS

| | | |
|---|---|---|
| WO | 2017201110 A1 | 11/2017 |
| WO | 2018160558 A1 | 9/2018 |

OTHER PUBLICATIONS

Balke et al., "A Strategy for Interpreting Multidetector Size-Exclusion Chromatography Data II", Chromatography Polym. Chpt 13, 1992.
Kratochvil, P., "Fundamental Light-Scattering Methods", Classical Light Scattering from Polymer Solutions, Chapter 3, 1987, pp. 113.
Mourey et al., "A Strategy for Interpreting Multidetector Size-Exclusion Chromatography Data I. Development of a Systematic Approach", Chromatography Polym. Chpt 12, 1992.
Bovey, F.A., "NMR and Macromolecules", ACS Symposium series 247, Published Mar. 28, 1984.
Randall, J.C., ACS Symposium Series 247, "NMR and Macromolecules, Sequence, Dynamic, and Domain Structure", Washington, D.C., 1984.
Randall, J.C., "A Review of High Resolution Liquid Carbon Nuclear Magnetic Resonance Characterizations of Ethylene-Based Polymers", Macromol. Chem., Phys., 1989, 201-317.
Jin et al., "Shrink Force Measurement of Low Shrink Force Films", SPE ANTEC Proceedings, p. 1264 (2008).
Williams et al., "The Construction of a Polyethylene Calibration Curve for Gel Permeation Chromatography Using Polystyrene Fractions", J. Polym. Sci., Polym. Let., 1968, 6, 621.
Yau, Wallace W., "Examples of Using 3D-GPC—TREF for Polyolefin Characterization," Macromol. Symp., 2007, 257, 29-45.
Zimm, B.H., "Apparatus and Methods for Measurement and Interpretation of the Angular Variation of Light Scattering; Preliminary Results on Polystyrene Solutions", J. Chem. Phys., 1948, 16, 1099.

* cited by examiner

ETHYLENE-BASED POLYMERS WITH IMPROVED OPTICS

REFERENCE TO RELATED APPLICATIONS

This application claims the benefit of U.S. Provisional Application 62/474,134, filed on Mar. 21, 2017.

BACKGROUND OF THE INVENTION

There is a need for a LDPE resin that has good optics and good processibility, and which can be used in blown film and shrink film applications. LDPE resins are described in the following patent references: U.S. Pat. Nos. 8,415,442, 9,243,087, 9,068,032, 9,22,8036 (see also U.S. Publication 2014/0316094), U.S. Pat. Nos. 8,822,601, 8,871,887, 8,916,667 (see also U.S. Pat. No. 9,303,107), U.S. Publication 2016/0137822, U.S. Publication 2016/0083568, WO2017/146981 and WO2017/201110. However, there remains a need for a LDPE resin that has good optics and processibility, and which can be used in single or multilayer blown films or shrink films. These needs have been met by the following invention.

SUMMARY OF THE INVENTION

A composition comprising an ethylene-based polymer, wherein the ethylene-based polymer comprises the following properties: a) a Mw(abs) from 130,000 to 162,00 g/mol; b) a melt index (I2) from 1.5 to 3.0 g/10 min; c) an ADF LS from 0.350 to 0.450 for molecular weight ≥500,000 g/mol.

DETAILED DESCRIPTION

Figure 1:
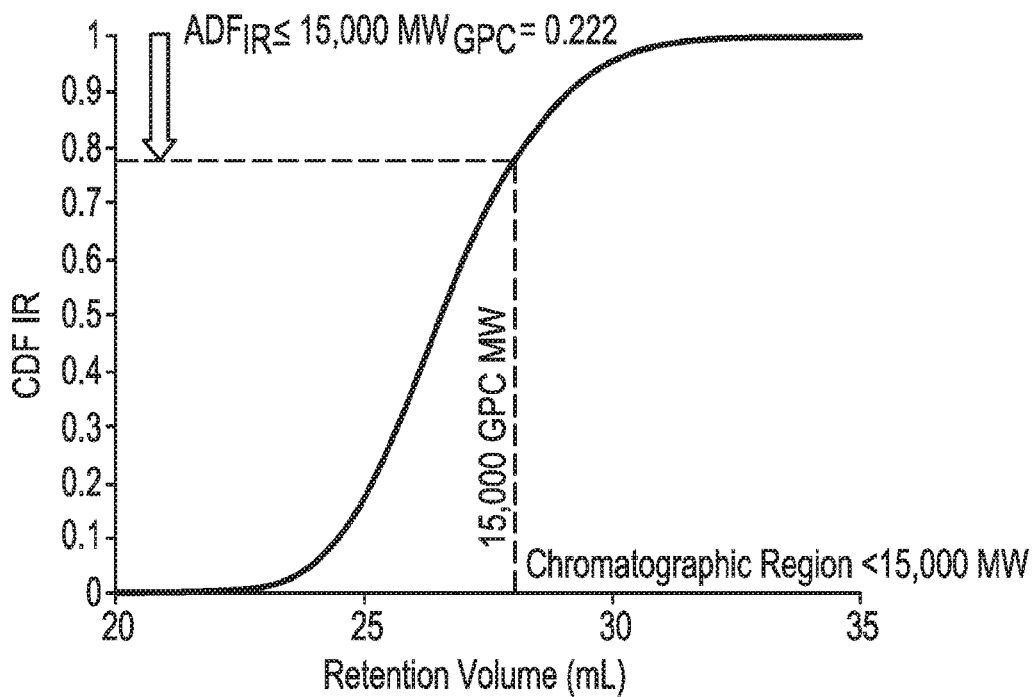
FIG. 1 depicts the "cumulative IR area vs retention volume" for the $CDF_{IR}$ determination of Ex. 1.

A composition comprising an ethylene-based polymer, wherein the ethylene-based polymer comprises the following properties: a) an Mw(abs) from 130,000 to 162,00 g/mol; b) a melt index (I2) from 1.5 to 3.0 g/10 min; and c) an ADF LS from 0.350 to 0.450 for molecular weight ≥500,000 g/mol. The composition may comprise a combination of two or more embodiments as described herein. The ethylene-based polymer may comprise a combination of two or more embodiments as described herein.

In one embodiment, or a combination of embodiments described herein, the ethylene-based polymer is a low density polyethylene (LDPE).

In one embodiment, or a combination of embodiments described herein, the ethylene-based polymer further comprises an ADF IR from 0.200 to 0.250 for molecular weight ≤15,000 g/mol. In one embodiment, or a combination of embodiments described herein, the ethylene-based polymer further comprises an ADF DV from 0.180 to 0.240 for molecular weight ≥200,000 g/mol.

In one embodiment, or a combination of embodiments described herein, the polymer further comprises a Mw(abs)/Mw(conv) from 1.8 to 2.0. In one embodiment, or a combination of embodiments described herein, the ethylene-based polymer further comprises an IV (abs) from 0.820 dL/g to 0.880 dL/g.

In one embodiment, or a combination of embodiments described herein, the ethylene-based polymer further comprises an ADF DV ≤0.210 for molecular weight ≤200,000 g/mol. In one embodiment, or a combination of embodiments described herein, the ethylene-based polymer further comprises a gpcBR ≤1.65, or ≤1.60, or ≤1.58, or ≤1.56.

In one embodiment, or a combination of embodiments described herein, the ethylene-based polymer has a density is from 0.923 to 0.927 g/cc, or from 0.923 to 0.926 g/cc, or from 0.924 to 0.926 g/cc (1 cc=1 $cm^3$). In one embodiment, or a combination of embodiments described herein, the ethylene-based polymer has a "45° gloss" greater than 72%, and a 2% MD secant modulus greater than 30,000 psi. In one embodiment, or a combination of embodiments described herein, the ethylene-based polymer has a ratio of MD normalized tear to CD normalized tear of less than 1.1 and greater than 0.8. In one embodiment, or a combination of embodiments described herein, the ethylene-based polymer has a ratio of MD shrink tension to CD shrink tension of less than 7.0 with a CD shrink tension greater than 0.9 psi. In each embodiment, the film thickness is 2.0±0.3 mil.

In one embodiment, or a combination of embodiments described herein, the ethylene-based polymer has a ratio of MD shrink tension to CD shrink tension ≤8.0, or ≤7.0, or ≤6.0, or ≤5.0. In one embodiment, or a combination of embodiments described herein, the ethylene-based polymer has a ratio of MD to CD shrink tension ≥1.0, or ≥2.0, or ≥3.0, or ≥4.0. In one embodiment, or a combination of embodiments described herein, the ethylene-based polymer has a MD shrink tension ≤10.0 psi, or ≤8.0 psi, or ≤6.0 psi, or ≤5.0 psi. In one embodiment, or a combination of embodiments described herein, the ethylene-based polymer has a MD shrink tension ≥1.0 psi, or ≥2.0 psi, or ≥3.0 psi, or ≥4.0 psi. In one embodiment, or a combination of embodiments described herein, the ethylene-based polymer has a CD shrink tension ≤2.0 psi, or ≤1.75 psi, or ≤1.5 psi, or ≤1.25 psi. In one embodiment, or a combination of embodiments described herein, the ethylene-based polymer has a CD shrink tension ≥0.5 psi, or ≥0.75 psi, or ≥0.9 psi, or ≥1.0 psi. In each embodiment, the film thickness is 2.0±0.3 mil.

In one embodiment, or a combination of embodiments described herein, the ethylene-based polymer has an $ADF_{IR}$ or ADF IR (at molecular weight (MW) ≤15,000 g/mol) ≥0.19, or ≥0.20, or ≥0.21, or ≥0.22. In a further embodiment, the ethylene-based polymer is a LDPE. A LDPE is known in the art, and refers to an ethylene homopolymer prepared using a free-radical, high pressure (≥100 MPa (for example, 100-400 MPa)) polymerization. In one embodiment, or a combination of embodiments described herein, the ethylene-based polymer has an $ADF_{IR}$ (at molecular weight (MW) ≤15,000 g/mol) ≤0.25, or ≤0.24, or ≤0.23. In a further embodiment, the ethylene-based polymer is a LDPE.

In one embodiment, or a combination of embodiments described herein, the ethylene-based polymer has an $ADF_{LS}$ or ADF LS (at molecular weight (MW) ≥500,000 g/mol) ≥0.355, or ≥0.360, or ≥0.365. In a further embodiment, the ethylene-based polymer is a LDPE. In one embodiment, or a combination of embodiments described herein, the ethylene-based polymer has an $ADF_{L}s$ (at molecular weight (MW) ≥500,000 g/mol) ≤0.400, or ≤0.395, or ≤0.390. In a further embodiment, the ethylene-based polymer is a LDPE.

In one embodiment, or a combination of embodiments described herein, the ethylene-based polymer has an $ADF_{DV}$ or ADF DV (at molecular weight (MW) ≥200,000 g/mol) ≥0.165, or ≥0.170, or ≥0.175, or ≥0.180. In a further embodiment, the ethylene-based polymer is a LDPE. In one embodiment, or a combination of embodiments described herein, the ethylene-based polymer has an $ADF_{DV}$ (at molecular weight (MW) ≥200,000 g/mol) ≤0.200, or ≤0.195, or ≤0.190. In a further embodiment, the ethylene-based polymer is a LDPE.

In one embodiment, or a combination of embodiments described herein, the ethylene-based polymer has an Mw (abs) from 130,000 to 160,000 g/mol, or from 135,000 to 160,000 g/mol, or from 140,000 to 160,000 g/mol. In a further embodiment, the ethylene-based polymer is a LDPE. In one embodiment, or a combination of embodiments described herein, the polymer has a Mz(abs) from 2,000,000 to 5,000,000 g/mol, or from 2,500,000 to 4,500,000 g/mol, and/or from 3,000,000 to 4,000,000 g/mol. In a further embodiment, the ethylene-based polymer is a LDPE. In one embodiment, or a combination of embodiments described herein, the ethylene-based polymer has a Mz(abs)/Mw(abs) from 12.0 to 30.0, or from 15.0 to 25.0, or from 18.0 to 23.0. In a further embodiment, the polymer is a LDPE. In one embodiment, the ethylene-based polymer has an Mw(abs)/Mw(conv) ratio ≥1.70, or ≥1.75, or ≥1.80, or ≥1.85. In a further embodiment, the polymer is a LDPE. In one embodiment, the ethylene-based polymer has an Mw(abs)/Mw (conv) ratio from 1.70 to 3.00, or from 1.70 to 2.50, or from 1.70 to 2.20, or from 1.70 to 2.00. In a further embodiment, the polymer is a LDPE.

In one embodiment, or a combination of embodiments described herein, the polymer has a GPC Mw(conv) from 60,000 to 200,000 g/mol, or from 65,000 to 150,000 g/mol, or from 70,000 to 130,000 g/mol, or from 75,000 to 100,000 g/mol. In a further embodiment, the ethylene-based polymer is a LDPE. In one embodiment, or a combination of embodiments described herein, the polymer has a Mw(conv)/Mn (conv) ≥4.6, or ≥4.8, or ≥5.0. In a further embodiment, the polymer is a LDPE. In one embodiment, or a combination of embodiments described herein, the polymer has a Mw(conv)/Mn(conv) ≤6.0, or ≤5.8, or ≤5.6. In a further embodiment, the ethylene-based polymer is a LDPE. In one embodiment, or a combination of embodiments described herein, the polymer has a Mn(conv) from 10,000 to 20,000 g/mol, or from 12,500 to 18,500 g/mol, or from 14,000 to 17,000 g/mol, or from 15,000 to 16,000 g/mol. In a further embodiment, the polymer is a LDPE. In one embodiment, the ethylene-based polymer has a z-average molecular weight Mz(conv) ≥200,000 g/mol, or ≥230,000 g/mol, or ≥250,000 g/mol. In one embodiment, or a combination of embodiments described herein, the ethylene-based polymer has a z-average molecular weight Mz(conv) ≤400,000 g/mol, or ≤350,000 g/mol, or ≤320,000 g/mol. Further, the ethylene-based polymer is a LDPE.

In one embodiment, or a combination of embodiments described herein, the ethylene-based polymer has a gpcBR value from 1.2 to 3.0, or from 1.3 to 2.5, or from 1.4 to 2.0, or from 1.4 to 1.8. In a further embodiment, the ethylene-based polymer is a LDPE. In one embodiment, the ethylene-based polymer has a LCBf value from 1.0 to 3.0, or from 1.1 to 2.5, or from 1.2 to 2.0, or from 1.2 to 1.7. In a further embodiment, the ethylene-based polymer is a LDPE. In one embodiment, or a combination of embodiments described herein, the ethylene-based polymer has an Intrinsic Viscosity (Absolute by viscometer on-line by GPC) or IV (bulk) >0.750, or >0.800. In one embodiment, or a combination of embodiments described herein, the polymer has an Intrinsic Viscosity (Absolute by viscometer on-line by GPC) or IV (abs) ≤0.920, or ≤0.900. In a further embodiment, the ethylene-based polymer is a LDPE.

In one embodiment, or a combination of embodiments described herein, the ethylene-based polymer has a melt strength (MS) at 190° C. ≤ $-1.87*(I_2$ at 190° C.)+10 cN. In one embodiment, or a combination of embodiments described herein, the ethylene-based polymer has a melt strength at 190° C. ≥ $-1.87*(I_2$ at 190° C.)+6 cN. In one embodiment, or a combination of embodiments described herein, the ethylene-based polymer has a melt strength at 190° C. ≥ $-1.87*(I_2$ at 190° C.)+8 cN. In one embodiment, or a combination of embodiments described herein, the ethylene-based polymer has a melt strength at 190° C. of ≤ $-1.87*(I_2$ at 190° C.)+10 cN, and a melt strength ≥ $-1.87*(I_2$ at 190° C.)+8 cN. In one embodiment, or a combination of embodiments described herein, the ethylene-based polymer has a melt strength at 190° C. of ≤ $-1.87*(I_2$ at 190° C.)+10 cN and ≥ $-1.87*(I_2$ at 190° C.)+6 cN. For each above equation, the unit of the "1.87 coefficient" is as follows: "(cN)/(g/10 min)". In a further embodiment, the ethylene-based polymer is a LDPE.

In one embodiment, or a combination of embodiments described herein, the ethylene-based polymer has a melt viscosity, at 0.1 rad/s and 190° C., ≥2,000 Pa·s, or ≥3,000 Pa·s, or ≥4,000 Pa·s, or ≥4,500 Pa·s. In one embodiment, or a combination of embodiments described herein, the ethylene-based polymer has a melt viscosity, at 0.1 rad/s and 190° C., ≤10,000 Pa·s, or ≤9,000 Pa·s, or ≤8,500 Pa·s, or ≤8,000 Pa·s, or ≤7,500 Pa·s, or ≤7,000 Pa·s. In a further embodiment, the ethylene-based polymer is a LDPE. In one embodiment, or a combination of embodiments described herein, the ethylene-based polymer has a melt viscosity ratio (V0.1/V100), at 190° C., ≥5.0, or ≥7.5, or ≥10. In one embodiment, or a combination of embodiments described herein, the ethylene-based polymer has a viscosity ratio (V0.1V/100, at 190° C.) from 5 to 20, or from 7.5 to 15, or from 8 to 14, or from 9 to 13. In a further embodiment, the ethylene-based polymer is a LDPE. In one embodiment, or a combination of embodiments described herein, the ethylene-based polymer has a tan delta (at 0.1 rad/s at 190° C.) ≤20, or ≤10, or ≤8.0, or ≤7.0. In one embodiment, the ethylene-based polymer has a tan delta (at 0.1 rad/s at 190° C.) from 2.0 to 15, or from 3.0 to 13, or from 4.0 to 10, or from 5.0 to 7.0. In a further embodiment, the ethylene-based polymer is a LDPE. In one embodiment, the ethylene-based polymer has a melt strength (MS) >3 cN, or >4 cN, or >5 cN.

In one embodiment, or a combination of embodiments described herein, the ethylene-based polymer has a melt index (I2) from 1.6 to 3.0 g/10 min, or from 1.8 to 3.0 g/10 min, or from 2.0 to 2.9 g/10 min. In a further embodiment, the ethylene-based polymer is a LDPE. In one embodiment, the ethylene-based polymer has a density from 0.910 to 0.940 g/cc, or from 0.910 to 0.930 g/cc, or from 0.915 to 0.9275 g/cc, or from 0.920 to 0.9275 g/cc, or from 0.923 to 0.927 g/cc (1 cc=1 $cm^3$). In a further embodiment, the ethylene-based polymer is a LDPE. In one embodiment, or a combination of embodiments described herein, the ethylene-based polymer has a % hexane extractables from 0.5 to 4.0 wt %, or from 0.5 to 3.0 wt %, or from 0.5 to 2.0 wt %, or from 0.75 to 1.25 wt %, based on the weight of the polymer. In a further embodiment, the ethylene-based polymer is a LDPE.

In one embodiment, or a combination of embodiments described herein, the ethylene-based polymer has ≥0.1 amyl groups (C5) per 1000 total carbon atoms, as determined by $^{13}$C NMR. In one embodiment, or a combination of embodiments described herein, the ethylene-based polymer has ≥0.2 amyl (C5) groups (branches) per 1000 total carbon atoms, or ≥0.5 amyl groups per 1000 total carbon atoms, or ≥1 amyl groups per 1000 total carbon atoms, or ≥1.2 amyl groups per 1000 total carbon atoms, or ≥1.5 amyl groups per 1000 total carbon atoms, in which the amyl group is equivalent to the C5 group, and measured by $^{13}$C NMR. In a further embodiment, the polymer is a LDPE. In one embodiment, or a combination of embodiments described herein, the polymer has ≤0.1 C1 (methyl groups) per 1000 total carbon atoms, as determined by $^{13}$C NMR. In a further embodiment, the polymer is a LDPE. In one embodiment, the ethylene-based polymer has from 1.0 to 5.0 of 1,3 diethyl branches per 1000 total carbon atoms, or from 1.5 to 4.0 of 1,3 diethyl branches per 1000 total carbon atoms, or from 1.75 to 3.5 of 1,3 diethyl branches per 1000 total carbon atoms, as determined by $^{13}$C NMR. In a further embodiment, the ethylene-based polymer is a LDPE. In one embodiment, or a combination of embodiments described herein, the ethylene-based polymer has from 1.0 to 5.0 of C6+ branches per 1000 total carbon atoms, or from 2.0 to 4.0 of C6+ branches per 1000 total carbon atoms, or from 2.0 to 3.0 of C6+ branches per 1000 total carbon atoms, as determined by $^{13}$C NMR. In a further embodiment, the polymer is a LDPE. In one embodiment, the ethylene-based polymer has from 0.5 to 3.0 isolated C2 from butene per 1000 total carbon atoms, or from 0.75 to 2.0 isolated C2 from butene per 1000 total carbon atoms, or from 1.0 to 2.0 isolated C2 from butene per 1000 total carbon atoms, as determined by $^{13}$C NMR. In a further embodiment, the polymer is a LDPE.

In one embodiment, or a combination of embodiments described herein, the ethylene-based polymer has from 0.25 to 2.0 C2 on the quaternary carbon atom per 1000 total carbon atoms, or from 0.5 to 1.5 C2 on the quaternary carbon atom per 1000 total carbon atoms, or from 0.6 to 1.2 C2 on the quaternary carbon atom per 1000 total carbon atoms, as determined by $^{13}$C NMR. In a further embodiment, the polymer is a LDPE. In one embodiment, the ethylene-based polymer has from 0.05 to 0.15 vinyls per 1000 total carbon atoms, or from 0.075 to 0.13 vinyls per 1000 total carbon atoms, or from 0.09 to 0.12 vinyls per 1000 total carbon atoms, as determined by 1H NMR. In a further embodiment, the polymer is a LDPE. In one embodiment, the ethylene-based polymer has from 0.1 to 0.3 cis and trans groups (vinylene) per 1000 total carbon atoms, or from 0.15 to 0.25 cis and trans per 1000 total carbon atoms, as determined by 1H NMR. In a further embodiment, the polymer is a LDPE. In one embodiment, the ethylene-based polymer has from 0.05 to 0.2 vinylidene per 1000 total carbon atoms, or from 0.075 to 0.15 vinylidene per 1000 total carbon atoms, as determined by 1H NMR. In a further embodiment, the polymer is a LDPE.

In one embodiment, or a combination of embodiments described herein, the ethylene-based polymer has a crystallization temperature from 90.0° C. to 110.0° C., or from 95.0° C. to 105.0° C., or from 100.0° C. to 101.0° C. In a further embodiment, the ethylene-based polymer is a LDPE. In one embodiment, or a combination of embodiments described herein, the ethylene-based polymer has a melting temperature from 95.0° C. to 115.0° C., or from 97.0° C. to 114.0° C., or from 110.0° C. to 114.0° C. In a further embodiment, the ethylene-based polymer is a LDPE.

In one embodiment, or a combination of embodiments described herein, the ethylene-based polymer is formed in a high pressure (P greater than 100 MPa), free radical polymerization process. In a further embodiment, the polymer is a LDPE.

In one embodiment, or a combination of embodiments described herein, the ethylene-based polymer is present in an amount ≥10 wt %, based on the weight of the composition. In one embodiment, or a combination of embodiments described herein, the ethylene-based polymer is present in an amount from 10 to 90 wt %, or from 20 to 40 wt %, based on the weight of the composition. In one embodiment, or a combination of embodiments described herein, the ethylene-based polymer is present in an amount from 60 to 90 wt %, or from 65 to 85 wt %, based on the weight of the composition. In a further embodiment, the polymer is a LDPE. In one embodiment, the ethylene-based polymer is present in an amount from 1 to 10 wt %, or from 1.5 to 8 wt %, or from 3 to 6 wt %, based on the weight of the composition. In one embodiment, the ethylene-based polymer is present in an amount from 80 to 100 wt %, or from 85 to 97 wt %, or from 85 to 95 wt %, based on the weight of the composition. In a further embodiment, the polymer is a LDPE.

In one embodiment, or a combination of embodiments described herein, the composition further comprises another ethylene-based polymer. Suitable other ethylene-based polymers include, but are not limited to, DOWLEX Polyethylene Resins, TUFLIN Linear Low Density Polyethylene Resins, ELITE or ELITE AT Enhanced Polyethylene Resins, or INNATE Precision Packaging Resins (all available from The Dow Chemical Company), high density polyethylenes (d ≥0.96 g/cc), medium density polyethylenes (density from 0.935 to 0.955 g/cc), EXCEED polymers and ENABLE polymers (both from ExxonMobil), LDPE, and EVA (ethylene vinyl acetate). In one embodiment, the second ethylene-based polymer is an ethylene/C3-C8 α-olefin copolymer, such as, for example, a LLDPE (Linear Low Density Polyethylene). In one embodiment, or a combination of embodiments described herein, the ethylene-based polymer is present in an amount from 10 wt % to 90 wt %, based on the sum of the weights of the ethylene-based polymer and the second ethylene-based polymer. In one embodiment, or a combination of embodiments described herein, the ethylene-based polymer is present from 3 wt % to 97 wt %, based on the sum weight of the ethylene-based polymer and the second ethylene-based polymer.

In one embodiment, or a combination of embodiments described herein, the composition further comprises a propylene-based polymer. Suitable propylene-based polymers include polypropylene homopolymers, propylene/α-olefin interpolymers, and propylene/ethylene interpolymers. Polymers include impact modifying polypropylene, isotactic polypropylene, atactic polypropylene, and random designation VERSIFY Plastomers & Elastomers (The Dow Chemical Company) and VISTAMAXX (ExxonMobil Chemical Co.) In one embodiment, or a combination of embodiments described herein, the composition further comprises a heterogeneously branched ethylene/α-olefin interpolymer or copolymer. In a further embodiment, such heterogeneously branched interpolymer or copolymer has a density from 0.89 to 0.94 g/cc, or from 0.90 to 0.93 g/cc. In one embodiment, the composition comprises less than 5 ppm, or less than 2 ppm, or less than 1 ppm, or less than 0.5 ppm sulfur, based on the weight of the composition. The invention also provides an article comprising at least one component formed from an inventive composition. In a further embodiment, the article is a film. In another embodiment, the article is a coating.

The invention also provides a process for forming the ethylene-based polymer of any of the previous embodiments, the process comprising polymerizing a mixture comprising ethylene, in at least one tubular reactor. The invention also provides a process for forming such ethylene-based polymer, the process comprising polymerizing a mixture comprising ethylene, in a combination of at least one tubular reactor and at least one autoclave reactor.

An inventive composition may comprise a combination of two or more embodiments as described herein. An inventive ethylene-based polymer may comprise a combination of two or more embodiments as described herein. An inventive LDPE may comprise a combination of two or more embodiments as described herein. An inventive article may comprise a combination of two or more embodiments as described herein. An inventive film may comprise a combination of two or more embodiments as described herein. An inventive process may comprise a combination of two or more embodiments as described herein.

Process

For producing an inventive ethylene-based polymer, including an inventive LDPE, a high pressure, free-radical initiated polymerization process is typically used. Typically, a jacketed tube is used as a reactor, which has one or more reaction zones. Suitable, but not limiting, reactor lengths may be from 100 to 3000 meters (m), or from 1000 to 2000 meters. The beginning of a reaction zone for the reactor is typically defined by the side injection of initiator of the reaction, ethylene, chain transfer agent (or telomer), as well as any combination thereof. A high pressure process can be carried out in one or more tubular reactors, having one or more reaction zones, or in a combination of autoclave and tubular reactors, each comprising one or more reaction zones.

A chain transfer agent can be used to control molecular weight. In a preferred embodiment, one or more chain transfer agents (CTAs) are added to an inventive process. Typical CTA's that can be used include, but are not limited to, propylene, n-butane, 1-butene, isobutane, propionaldehyde, and methyl ethyl ketone. In one embodiment, the amount of CTA used in the process is from 0.03 to 10 weight percent of the total reaction mixture. Ethylene used for the production of the ethylene-based polymer may be purified ethylene, which is obtained by removing polar components from a loop recycle stream, or by using a reaction system configuration, such that only fresh ethylene is used for making the inventive polymer. It is not typical that only purified ethylene is required to make the ethylene-based polymer. In such cases ethylene from the recycle loop may be used. In one embodiment, the ethylene-based polymer is a LDPE.

Additives and Applications

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The composition may, for example, comprise less than 10 percent (by the combined weight) of one or more additives, based on the weight of the composition. In one embodiment, the polymers of this invention are treated with one or more stabilizers, for example, antioxidants, such as IRGANOX 1010, IRGANOX 1076 and IRGAFOS 168 (Ciba Specialty Chemicals).

The polymers of this invention may be employed in a variety of thermoplastic fabrication processes to produce useful articles, including, but not limited to, monolayer and multilayer films; molded articles, such as blow molded, injection molded, or rotomolded articles; coatings (for example, extrusion coatings); fibers; and woven or nonwoven fabrics. An inventive polymer may be used in a variety of films, including but not limited to, food packaging, consumer, industrial, agricultural (applications or films), lamination films, fresh cut produce films, meat films, cheese films, candy films, clarity shrink films, collation shrink films, stretch films, silage films, greenhouse films, fumigation films, liner films, stretch hood, heavy duty shipping sacks, pet food, sandwich bags, sealants, and diaper backsheets. An inventive polymer may be used for wire and cable coating operations, in sheet extrusion for vacuum forming operations, and forming molded articles, including the use of injection molding, blow molding, or rotomolding processes.

Definitions

The term "polymer," as used herein, refers to a polymeric compound prepared by polymerizing monomers, whether of the same or a different type. The generic term polymer thus embraces the term homopolymer (employed to refer to polymers prepared from only one type of monomer), with the understanding that low amounts of impurities (for example, low amounts (e.g., ≤1.0 wt %, or ≤0.5 wt %, or ≤0.3 wt %) of CTA) can be incorporated into the polymer structure, and the term interpolymer as defined hereinafter. Impurities may be incorporated into and/or within a polymer. The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers. The term "ethylene-based polymer," as used herein, refers to a polymer that comprises 50 wt % or a majority amount of polymerized ethylene monomer (based on the weight of the polymer), and, optionally, may contain at least one comonomer. The term "propylene-based polymer," as used herein, refers to a polymer that comprises a majority amount of polymerized propylene monomer (based on weight of the polymer) and, optionally, may comprise at least one comonomer.

The term "composition," as used herein, includes a mixture of materials which comprise the composition, as well as reaction products and decomposition products formed from the materials of the composition. The terms "blend" or "polymer blend," as used, refers to a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (e.g., simultaneous forming within the same reactor).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. The term, "consisting essentially of" excludes from the scope of any succeeding recitation any other component, step or procedure, excepting those that are not essential to operability. The term "consisting of" excludes any component, step or procedure not specifically delineated or listed. TEST METHODS (current version of ASTM test methods used)

Density

Samples for density measurements were prepared according to ASTM D 4703 Annex A1 Procedure C. Approx. 7 g of sample was placed in a "2"×2"×135 mil thick" mold, and this was pressed at 374° F. (190° C.) for 6 mins at 3,000 lbf. The pressure was increased to 30,000 lbf for 4 mins. This was followed by cooling at 15° C./min, at 30,000 lbf, to approx. a temp. of 40° C. The "2"×2"×135 mil" polymer sample (plaque) was removed from the mold, and 3 samples were cut from the plaque with a ½"×1" die cutter. Measurements were made within 1 hour of sample pressing, using ASTM D792, Method B, and an average of 3 measurements reported.

Melt Index

Melt index (MI), or I2, was measured in accordance with ASTM D 1238, Condition 190° C./2.16 kg, Procedure B, and reported in grams eluted per 10 minutes (g/10 min).

Hexane Extractables

Polymer pellets (from polymerization pelletization process, without further modification; approx. 2.2 grams per one "1-inch×1-inch" square film) were pressed in a Carver Press at a thickness of 3.0-4.0 mils. The pellets were pressed at 190° C. for 3 minutes, at 40,000 lbf. Non-residue gloves (PIP*CleanTeam*CottonLisle Inspection Gloves, Part Number: 97-501) were worn to prevent contamination of the film with residual oils from the operator hands. Each film was trimmed to a "1-inch×1-inch" square, and weighed (2.5±0.05 g). The films were extracted for 2 hours, in a hexane vessel, containing about 1000 ml of hexane, at 49.5±0.5° C., in a heated water bath. The hexane was an isomeric "hexanes" mixture (for example, Hexanes (Optima), Fisher Chemical, high purity mobile phase for HPLC and/or extraction solvent for GC applications). After two hours, the films were removed, rinsed in clean hexane, and dried in a vacuum oven (80±5° C.) at full vacuum (ISOTEMP Vacuum Oven, Model 281A, at approx. 30 inches Hg) for two hours. The films were then placed in a desiccator, and allowed to cool to room temp. for a min. of one hour. The films were then reweighed, and the amount of mass loss due to extraction in hexane was calculated. This method is based on 21 CRF 177.1520 (d)(3)(ii), with one deviation from FDA protocol by using hexanes instead of n-hexane; reported average of 3 measurements.

Nuclear Magnetic Resonance ($^{13}$C NMR)

Each sample was prepared by adding approx. "3 g of a 50/50 mixture of tetrachloro-ethane-d2/orthodichlorobenzene, containing 0.025 M Cr(AcAc)$_3$," to a "0.25 g polymer sample," in a 10 mm NMR tube. The sample was then dissolved and homogenized by heating the tube and its contents to 150° C., using a heating block and heat gun. Each dissolved sample was visually inspected to ensure homogeneity. All data were collected using a Bruker 400 MHz spectrometer, equipped with a Bruker Dual DUL high-temp. CryoProbe. The data was acquired using a six second pulse repetition delay, 90-degree flip angles, and inverse gated decoupling, with a sample temperature of 120° C. All measurements were made on non-spinning samples in locked mode. The $^{13}$C NMR chemical shifts were internally referenced to the EEE triad at 30.0 ppm. The C6+ value was a direct measure of C6+ branches in LDPE, where the long branches were not distinguished from chain ends. The 32.2 ppm peak, representing the third carbon from the end of all chains or branches of six or more carbons, was used to determine the C6+ value. C6 branching in LLDPE was determined using well known NMR spectroscopic methods for determining polymer composition. ASTM D 5017-96, J. C. Randall et al., in "NMR and Macromolecules" ACS Symposium series 247, J. C. Randall, Ed., Am. Chem. Soc., Washington, D.C., 1984, Ch. 9, and J. C. Randall in "Polymer Sequence Determination", Academic Press, New York (1977) provide general methods of polymer analysis by NMR spectroscopy. Other peaks of interest are listed in Table A.

TABLE A

| Branch Type | Peak(s) integrated | Identity of the integrated carbon peak(s) |
| --- | --- | --- |
| 1,3 diethyl | About 10.5 to 11.5 ppm | 1,3 diethyl branch methyls |
| C1 | About 19.75 to 20.50 ppm | C1, methyls |
| C2 on Quat Carbon | About 7.7 to 8.6 ppm | 2 ethyl groups on a quaternary carbon |
| C4 | About 23.3 to 23.5 ppm | Second $CH_2$ in a 4-carbon branch, counting the methyl as the first C |
| C5 | About 32.60 to 32.80 ppm | Third $CH_2$ in a 5-carbon branch, counting the methyl as the first C |
| Isolated C2 branches | About 39.6 to 39.7 ppm | Isolated C2 branch methines |

Nuclear Magnetic Resonance ($^1$H NMR)

Each sample was prepared by adding approximately 130 mg of sample to "3.25 g of 50/50, by weight, tetrachlorethane-d2/perchloroethylene" with 0.001 M Cr(AcAc)$_3$, in a NORELL 1001-7, 10 mm NMR tube. The sample was purged by bubbling $N_2$ through the solvent, via a pipette inserted into the tube, for approximately five minutes, to prevent oxidation. The tube was capped, sealed with TEFLON tape, and then soaked at room temperature, overnight, to facilitate sample dissolution. The sample was heated and vortexed at 115° C. to ensure homogeneity. The $^1$H NMR was performed on a Bruker AVANCE 400 MHz spectrometer, equipped with a Bruker Dual DUL high-temperature CryoProbe, and at a sample temperature of 120° C. Two experiments were run to obtain spectra, a control spectrum to quantitate the total polymer protons, and a double presaturation experiment, which suppressed the intense polymer backbone peaks, and enabled high sensitivity spectra for quantitation of the end-groups. The control was run with ZG pulse, 16 scans, AQ 1.64s, D1 14s. The double presaturation experiment was run with a modified pulse sequence, 100 scans, AQ 1.64 s, presaturation delay 1 s, relaxation delay 13 s. The signal from residual $^1$H in TCE-d2 (at 6.0 ppm) was integrated, and set to a value of 100, and the integral from 3 to −0.5 ppm was used as the signal from the whole polymer in the control experiment. For the presaturation experiment, the TCE signal was also set to 100, and the corresponding integrals for unsaturation (vinylene (cis and trans) at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

Melt Strength

Melt strength measurements were conducted on a Gottfert Rheotens 71.97 (Goettfert Inc.; Rock Hill, S.C.), attached to a Gottfert Rheotester 2000 capillary rheometer. The melted sample (about 25 to 30 grams) was fed with a Goettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/s$^2$. The tensile force was recorded as a function of the take-up speed of the nip rolls. Melt strength was reported as the average plateau force (cN) and the velocity at break is reported in mm/s. The following conditions were used in the melt strength measurements: plunger speed=0.265 mm/second; wheel acceleration=2.4 mm/s$^2$; capillary diameter=2.0 mm; capillary length=30 mm; and barrel diameter=12 mm.

Dynamic Mechanical Spectroscopy (DMS)

Resins were compression-molded into "3 mm thick×1 inch" circular plaques at 350° F., for 6.5 minutes, under 20,000 lbf, in air. The sample was then taken out of the press, and placed on the counter to cool.

A constant temperature frequency sweep was performed, using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of 2 mm, the sample trimmed (extra sample that extends beyond the circumference of the "25 mm diameter" plate was removed), and then the test was started. The method had an additional five minute delay built in, to allow for temperature equilibrium. The experiments were performed at 190° C., over a frequency range of 0.1 to 100 rad/s. The strain amplitude was constant at 10%. The complex viscosity η*, tan (δ) or tan delta, viscosity at 0.1 rad/s (V0.1), the viscosity at 100 rad/s (V100), and the viscosity ratio (V0.1/V100) were measured.

Triple Detector Gel Permeation Chromatography (TDGPC)

The chromatographic system consisted of a PolymerChar GPC-IR (Valencia, Spain) high temperature GPC chromatograph, equipped with an internal IR5 infra-red detector (IR5) coupled to a Precision Detectors (Now Agilent Technologies) 2-angle laser light scattering (LS) detector Model 2040, and followed by a PolymerChar 4-capillary viscosity detector (three detectors in series). For all light scattering measurements, the 15 degree angle was used for measurement purposes. The autosampler oven compartment was set at 160° Celsius, and the column compartment was set at 150° Celsius. The columns used were four, AGILENT "Mixed A" columns, each 30 cm, and each packed with 20-micron linear mixed-bed particles. The chromatographic solvent used was 1,2,4-trichlorobenzene, which contained 200 ppm of butylated hydroxytoluene (BHT). The solvent source was nitrogen sparged. The injection volume was 200 microliters, and the flow rate was 1.0 ml/min. Calibration of the GPC column set was performed with at least 20 narrow molecular weight distribution, polystyrene standards with molecular weights ranging from 580 to 8,400,000 g/mol. These standards were arranged in 6 "cocktail" mixtures, with approx. a decade of separation between individual molecular weights. The standards were purchased from Agilent Technologies. The polystyrene standards were prepared at "0.025 grams in 50 milliliters of solvent" for molecular weights ≥1,000,000, g/mol, and at "0.05 grams in 50 milliliters of solvent" for molecular weights <1,000,000 g/mol. The polystyrene (PS) standards were dissolved at 80° C., with gentle agitation, for 30 minutes. The PS standard peak molecular weights (IR 5 detector) were converted to polyethylene molecular weights using EQN. 1 (as described in Williams and Ward, J. Polym. Sci., Polym. Let., 6, 621 (1968)):

$M_{polyethylene} = A \times (M_{polystyrene})^B$ (EQN 1), where M is the molecular weight, A has a value of 0.4315, and B is equal to 1.0. A fifth order polynomial was used to fit the respective polyethylene-equivalent calibration points. A small adjustment to A (from approximately 0.415 to 0.44) was made to correct for column resolution and band-broadening effects, such that NIST standard NBS 1475 was obtained at 52,000 g/mol (Mw). The total plate count of the GPC column set was performed with EICOSANE (prepared at 0.04 g in 50 milliliters of TCB (1,2,4-trichloro-benzene) stabilized solvent, and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\ Max})}{\text{Peak Width at } \frac{1}{2} \text{ height}} \right)^2, \quad \text{(EQN 2)}$$

where RV is the retention volume in milliliters, the peak width is in milliliters, the peak max is the maximum height of the peak, and ½ height is the ½ height of the peak maximum:

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})}, \quad \text{(EQN 3)}$$

where RV is the retention volume in milliliters, and the peak width is in milliliters, "Peak max" is the maximum IR signal height corresponding to an "RV position" on the chromatogram, "One tenth height" 1/10 height of the peak maximum, where "Rear peak" refers to the peak tail at a signal retention volume (at 1/10 height of peak maximum), later than the peak max, and where "Front peak" refers to the peak front at a signal retention volume (at 1/10 height of peak maximum), earlier than the peak max. The plate count for the chromatographic system should be greater than 24,000, and the symmetry should be between 0.98 and 1.22. Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temp. autosampler. Decane (a flow rate marker) was added to each sample (about 5 microliters). The samples were dissolved for 2 hours at 160° C., under a "low speed" shaking.

IR 5 Chromatogram

The calculations of Mn(conv), Mw(conv), and Mz(conv) were based on the GPC results, using the internal IR5 detector (measurement channel) of the PolymerChar GPC-IR chromatograph, according to Eqns 4-6, using PolymerChar GPCOne™ software (version 2013G), the baseline-subtracted IR chromatogram at each equally-spaced data collection point (i), and the polyethylene equivalent molecular weight obtained from the narrow standard calibration curve for the point (i) from Eqn 1. Table 4 lists the conventional GPC results for the examples and comparative examples using Eqns 4-6, below for the conventional GPC.

$$Mn_{(conv)} = \frac{\sum_{i}^{i} IR_i}{\sum_{i}^{i} (IR_i / M_{polyethylene_i})}, \quad \text{(EQN 4)}$$

$$Mw_{(conv)} = \frac{\sum_{i}^{i} (IR_i * M_{polyethylene_i})}{\sum_{i}^{i} IR_i}, \quad \text{(EQN 5)}$$

$$Mz_{(conv)} = \frac{\sum_{i}^{i} (IR_i * M_{polyethylene_i}^2)}{\sum_{i}^{i} (IR_i * M_{polyethylene_i})}. \quad \text{(EQN 6)}$$

In order to monitor the deviations over time, a flowrate marker (decane) was introduced into each sample via a micropump controlled with the PolymerChar GPC-IR system. This flowrate marker (FM, here decane) was used to linearly correct the pump flowrate (Flowrate(nominal)) for each sample, by aligning the RV value of the respective decane peak within the sample (RV(FM Sample)), to that of the decane peak within the narrow standards calibration (RV(FM Calibrated)). Any changes in the time of the decane marker peak were then assumed to be related to a linear-shift in flowrate (Flowrate(effective)) for the entire run. To facilitate the highest accuracy of a RV measurement of the flow marker peak, a least-squares fitting routine was used to fit the peak of the flow marker concentration chromatogram to a quadratic equation. The first derivative of the quadratic equation was then used to solve for the true peak position. After calibrating the system based on a flow marker peak, the effective flowrate (with respect to the narrow standards calibration) was calculated using Eqn 7. Processing of the flow marker peak was done via the PolymerChar GPCOne™ Software. Acceptable flowrate correction was such that the effective flowrate should be within +/−2% of the nominal flowrate. Flowrate(effective)=Flowrate(nominal)*(RV(FM Calibrated)/RV(FM Sample)) (EQN 7).

The Systematic Approach for the determination of multi-detector offsets was done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)). Alignment of the triple detector log (MW and IV) results (generated from a broad homopolymer polyethylene standard (Mw/Mn=3)), to the narrow standard column calibration results (generated from the narrow standards calibration curve), was done using the PolymerChar GPCOne™ Software.

Light Scattering Chromatogram

The absolute molecular weight data (MW(abs)) was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)), using the PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight (traceable to NBS 1475 homopolymer polyethylene reference sample). The calculated molecular weights (using GPCOne™) were obtained using a light scattering constant, derived from one or more of the polyethylene standards mentioned below, and a refractive index conc. coefficient, dn/dc, of 0.104. Generally, the mass detector response (IR5) and the light scattering constant (determined using GPCOne™) should be determined from a linear standard with a molecular weight in excess of about 50,000 g/mol. The equation for Mw(abs) is an area-based result, using the baseline-subtracted 15 degree light scattering signal and the baseline-subtracted IR5 measurement sensor signal (applying the mass and light scattering constants), as determined from GPCOne™ software, $$Mw_{(abs)} = \frac{\sum_{i}^{i} LS_i}{\sum_{i}^{i} IR_i} \times \text{Mass Constant}/LS \text{ constant.} \quad \text{(EQN 8A)}$$

The equation for Mz(abs) relied on a point-by point determination of the absolute molecular weight derived from the ratio of the baseline-subtracted, 15 degree light scattering signal and the baseline-subtracted, IR5 measurement sensor signal, and factored for the mass constant and light scattering constant, using GPCOne™ software. A straight-line fit was used to extrapolate the absolute molecular weight, where either detector (IR5 or LS) is below approximately 4% relative peak signal height (maximum peak height).

$$Mz_{(abs)} = \frac{\sum_{i}^{i} (IR_i * M_{Abs_i}^2)}{\sum_{i}^{i} (IR_i * M_{Abs_i})}. \quad \text{(EQN 8B)}$$

Viscosity Chromatogram

The absolute intrinsic viscosity data (IV (abs)) was obtained using the area of the specific viscosity chromatogram, obtained from the PolymerChar viscometer detector, when calibrated to the known intrinsic viscosity of NBS 1475. The overall injected concentration, used in the determination of the intrinsic viscosity, was obtained from the mass detector area and the mass detector constant, derived from a suitable linear polyethylene homopolymer, or one of the polyethylene standards of known intrinsic viscosity (traceable to NBS 1475 homopolymer polyethylene reference sample). The eqn for IV (abs) is an area-based result using the baseline-subtracted specific-viscosity signal (DV) and the baseline-subtracted IR5 measurement sensor signal (applying the mass and viscosity constants), determined from GPCOne™ software:

$$IV_{(Abs)} = \frac{\sum_{i}^{i} DV_i}{\sum_{i}^{i} IR_i} \times (\text{Mass Constant/Viscosity constant}). \quad \text{(EQN 8C)}$$

gpcBR Branching Index by Triple Detector GPC (TDGPC)

The gpcBR branching index was determined by first calibrating the light scattering, viscosity, and concentration detectors as described previously. Baselines were then subtracted from the light scattering, viscometer, and concentration chromatograms. Integration windows were then set, to ensure integration of all of the low molecular weight retention volume range in the light scattering and viscometer chromatograms that indicate the presence of detectable polymer from the refractive index chromatogram. Linear polyethylene standards were then used to establish polyethylene and polystyrene Mark-Houwink constants. Upon obtaining the constants, the two values were used to construct two linear reference conventional calibrations for polyethylene molecular weight and polyethylene intrinsic viscosity as a function of elution volume, as shown in Eqns (9) and (10):

$$M_{PE} = \left(\frac{K_{PS}}{K_{PE}}\right)^{1/\alpha_{PE}+1} \cdot M_{PS}^{\alpha_{PS}+1/\alpha_{PE}+1}, \quad \text{(EQN 9)}$$

$$[\eta]_{PE} = K_{PS} \cdot M_{PS}^{\alpha+1}/M_{PE}. \quad \text{(EQN 10)}$$

The gpcBR branching index is a robust method for the characterization of long chain branching as described in Yau, Wallace W., "Examples of Using 3D-GPC—TREF for Polyolefin Characterization," Macromol. Symp., 2007, 257, 29-45. The index avoids the "slice-by-slice" TDGPC calculations traditionally used in the determination of g' values and branching frequency calculations, in favor of whole polymer detector areas. From TDGPC data, one can obtain the sample bulk absolute weight average molecular weight (Mw, abs) by the light scattering (LS) detector, using the peak area method. The method avoids the "slice-by-slice" ratio of light scattering detector signal over the concentration detector signal, as required in a traditional g' determination. With TDGPC, sample intrinsic viscosities were also obtained independently using Eqn (11). The area calculation in this case offers more precision, because, as an overall sample area, it is much less sensitive to variation caused by detector noise and TDGPC settings on baseline and integration limits. More importantly, the peak area calculation was not affected by the detector volume offsets. Similarly, the high-precision, sample intrinsic viscosity (IV) was obtained by the area method in Eqn (11):

$$IV = [\eta] = \sum_i w_i IV_i = \quad \text{(EQN 11)}$$

$$\sum_i \left(\frac{C_i}{\sum_i C_i}\right) IV_i = \frac{\sum_i C_i IV_i}{\sum_i C_i} = \frac{\sum_i DP_i}{\sum_i C_i} = \frac{DP \text{ Area}}{\text{Conc. Area}},$$

where DPi stands for the differential pressure signal monitored directly from the online viscometer. To determine the gpcBR branching index, the light scattering elution area for the sample polymer was used to determine the molecular weight of the sample. The viscosity detector elution area for the sample polymer was used to determine the intrinsic viscosity (IV or [η]) of the sample. Initially, the molecular weight and intrinsic viscosity for a linear polyethylene standard sample, such as SRM1475a or an equivalent, were determined using the conventional calibrations ("cc") for both molecular weight and intrinsic viscosity as a function of elution volume:

$$[\eta]_{CC} = \sum_i \left(\frac{C_i}{\sum_i C_i}\right) IV_i = \sum_i w_i IV_{cc,i}. \quad \text{(EQN 12)}$$

Equation (13) was used to determine the gpcBR branching index:

$$gpcBR = \left[\left(\frac{[\eta]_{CC}}{[\eta]}\right) \cdot \left(\frac{M_W}{M_{W,CC}}\right)^{\alpha_{PE}} - 1\right], \quad \text{(EQN 13)}$$

wherein $[\eta]$ is the measured intrinsic viscosity, $[\eta]_{cc}$ is the intrinsic viscosity from the conventional calibration (or conv GPC), Mw is the measured weight average molecular weight, and $M_{w,cc}$ is the weight average molecular weight from the conventional calibration. The weight average molecular weight by light scattering (LS) is commonly referred to as "absolute weight average molecular weight" or "Mw(abs)." The $M_{w,cc}$ from using the conventional GPC molecular weight calibration curve ("conventional calibration") is often referred to as "polymer chain backbone molecular weight," "conventional weight average molecular weight" and "Mw(conv)."

All statistical values with the "cc or conv" subscript are determined using their respective elution volumes, the corresponding conventional calibration as previously described, and the concentration (Ci). The non-subscripted values are measured values based on the mass detector, LALLS, and viscometer areas. The value of KPE is adjusted iteratively, until the linear reference sample has a gpcBR measured value of zero. For example, the final values for a and Log K for the determination of gpcBR in this particular case are 0.725 and −3.355, respectively, for polyethylene, and 0.722 and −3.993, respectively, for polystyrene. Once the K and a values have been determined using the procedure discussed previously, the procedure was repeated using the branched samples. The branched samples were analyzed using the final Mark-Houwink constants as the best "cc" calibration values.

The interpretation of gpcBR is straight forward. For linear polymers, gpcBR will be close to zero, since the values measured by LS and viscometry will be close to the conventional calibration standard. For branched polymers, gpcBR will be higher than zero, especially with high levels of long chain branching, because the measured polymer molecular weight will be higher than the calculated $M_{w,cc}$, and the calculated $IV_{cc}$ will be higher than the measured polymer IV. In fact, the gpcBR value represents the fractional IV change due to the molecular size contraction effect as a result of polymer branching. A gpcBR value of 0.5 or 2.0 would mean a molecular size contraction effect of IV at the level of 50% and 200%, respectively, versus a linear polymer molecule of equivalent weight. For these particular examples, the advantage of using gpcBR, in comparison to a traditional "g' index" and branching frequency calculations, is due to the higher precision of gpcBR. All of the parameters used in the gpcBR index determination are obtained with good precision, and are not detrimentally affected by the low TDGPC detector response at high molecular weight from the concentration detector. Errors in detector volume alignment also do not affect the precision of the gpcBR index determination.

Calculation of LCB Frequency (LCB$_f$)

The LCB$_f$ was calculated for each polymer sample by the following procedure: 1) The light scattering, viscosity, and concentration detectors were calibrated with NBS 1475 homopolymer polyethylene (or equivalent reference). 2) The light scattering and viscometer detector offsets were corrected relative to the concentration detector as described above in the calibration section (see references to Mourey and Balke). 3) Baselines were subtracted from the light scattering, viscometer, and concentration chromatograms and set integration windows making certain to integrate all of the low molecular weight retention volume range in the light scattering chromatogram that is observable from the refractometer chromatogram. 4) A linear homopolymer polyethylene Mark-Houwink reference line was established by injecting a standard with a polydispersity of at least 3.0, calculate the data file (from above calibration method), and record the intrinsic viscosity and molecular weight from the mass constant corrected data for each chromatographic slice. 5) The LDPE sample of interest was analyzed, the data file (from above calibration method) was calculated, and the intrinsic viscosity and molecular weight from the mass constant, corrected data for each chromatographic slice, were recorded. At lower molecular weights, the intrinsic viscosity and the molecular weight data may need to be extrapolated such that the measured molecular weight and intrinsic viscosity asymptotically approach a linear homopolymer GPC calibration curve. 6) The homopolymer linear reference intrinsic viscosity was shifted at each point (i) by the following factor: $IV_i=IV_i*0.964$ where IV is the intrinsic viscosity. 7) The homopolymer linear reference molecular weight was shifted by the following factor: $M=M*1.037$ where M is the molecular weight. 8) The $g'$ at each chromatographic slice was calculated according to the following equation: $g'=(IV(LDPE)/IV(\text{linear reference}))$, at the same M. The IV(linear reference) was calculated from a fifth-order polynomial fit of the reference Mark-Houwink Plot and where IV(linear reference) is the intrinsic viscosity of the linear homopolymer polyethylene reference (adding an amount of SCB (short chain branching) to account for backbiting through 6) and 7) at the same molecular weight (M)). The IV ratio is assumed to be one at molecular weights less than 3,500 g/mol to account for natural scatter in the light scattering data. 9) The number of branches at each data slice was calculated according to the following equation:

$$\left[\frac{IV_{LDPE}}{IV_{linear\_reference}}\right]_M^{1.33} = \left[\left(1+\frac{B_n}{7}\right)^{1/2} + \frac{4}{9}\frac{B_n}{\pi}\right]^{-1/2}.$$

10) The average LCB quantity was calculated across all of the slices (i), according to the following eqn ($LCB_{1000\ C}=LCB_f$):

$$LCB_{1000C} = \frac{\sum_{M=3500}^{i}\left(\frac{B_{ni}}{14000}c_i\right)}{\sum c_i}$$

Molecular Architecture Determination

In order to determine the molecular architecture of various polymer compositions, the following procedure was used. The chromatographic system consisted of a Polymer-Char GPC-IR high temperature chromatograph equipped with a 4-capillary viscometer and an Agilent Technologies 2-angle laser light scattering detector Model 2040. The 15-degree angle of the light scattering detector was used for calculation purposes, and the IR5 "measurement channel" was used as a measure of concentration. Data was collected and processed using PolymerChar GPC One® software. The system was equipped with an on-line solvent degas device. The column compartment was operated at 160° C. The columns used were 4 Agilent "Mixed A" 30 cm 20-micron analytical columns. The solvent used was 1,2,4-trichlorobenzene. The samples were prepared at a concentration of 0.1 grams of polymer in 50 milliliters of solvent. The chromatographic solvent and the sample preparation solvent contained 200 ppm of butylated hydroxytoluene (BHT). Both solvent sources were nitrogen sparged. Polyethylene samples were shaken gently (speed of 1) at 160 degrees Celsius for 3 hours. The injection volume used was 200 microliters and the flow rate was 1.0 ml/min.

Calibration of the GPC column set was performed with at least 20 narrow molecular weight distribution polystyrene standards, with molecular weights ranging from 580 to 8,400,000 g/mol and were arranged in 6 "cocktail" mixtures with approximately a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were pre-dissolved at 80° C. with gentle agitation for 30 minutes. The polystyrene standard peak molecular weights were converted to polyethylene molecular weights using the following eqn (as described in Williams and Ward, J. Polym. Sci., Polym. Lett., 6, 621 (1968)): Mpolyethylene=A×(Mpolystyrene)$^B$, where M is the molecular weight, A has a value of 0.41 and B is equal to 1.0. A third order polynomial was used to fit the respective polyethylene-equivalent GPC Log(molecular weight) calibration points. The total plate count of the GPC column set was performed with decane (prepared at 0.04 g in 50 milliliters of TCB and dissolved for 20 minutes with gentle agitation.) The plate count and symmetry were measured on a 200 microliter injection according to the following eqns:

$$\text{Plate Count} = 5.545\left(\frac{RV_{Peak\ Maxium}}{\text{Front } RV_{\frac{1}{2}Peak\ Maxium} - \text{Rear } RV_{\frac{1}{2}Peak\ maxium}}\right)^2,$$

where RV is the retention volume in milliliters.

$$\text{Symmetry} = \frac{\left(\text{Rear Peak } RV_{\frac{1}{10}Peak\ maximum} - RV_{Peak\ Maximum}\right)}{\left(RV_{Peak\ Maximum} - \text{Front } RV_{\frac{1}{10}Peak\ maximum}\right)},$$

where RV is in milliliters.

The plate count of the chromatographic system must be above 22,000 and the symmetry must be less than 1.25. The Systematic Approach for the determination of multi-detector offsets was done in a manner consistent with that published by Balke, Mourey, et. al (Mourey and Balke, Chromatography Polym. Chpt 12, (1992)) (Balke, Thitiratsakul, Lew, Cheung, Mourey, Chromatography Polym. Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the molecular weight was obtained from the sample refractive index area and the infra-red detector calibration from a linear polyethylene homopolymer of 120,000 molecular weight. The chromatographic concentrations were assumed low enough to eliminate addressing 2nd Virial coefficient effects (concentration effects on molecular weight). The Log (molecular weight) elution obtained by Light Scattering of the linear homopolymer reference material should be consistent with the conventional GPC as described above. Decane was included (via GPC-IR micropump) with each calibration and sample run and was used to provide flowrate referencing for each sample run back to the original calibration curve. The calculation of the cumulative detector fractions (CDF) for the infra-red measurement channel ("CDF IR") the viscometer detector ("CDF DV") and the low angle laser light scattering detector ("CDF LS") are accomplished by the following steps: 1) Linearly flow correct the chromatogram based on the relative retention volume ratio of the air peak between the sample and that of a consistent narrow standards cocktail mixture. 2) Correct the light scattering detector and viscometer detector offset relative to the refractometer as described in the calibration section. 3) Subtract baselines from the light scattering, viscometer, and refractometer chromatograms and set integration windows making certain to integrate all of the low molecular weight retention volume range in the light scattering and viscometer chromatograms that is observable from the refractometer chromatogram. 4) Calculate the molecular weights at each data slice based on the polystyrene calibration curve, modified by the polystyrene to polyethylene conversion factor (0.41) as described in the calibration section. 5) Calculate the Area Detector Fraction (ADF) of each chromatogram (ADFIR, ADFDV, and ADFLS) as the chromatographic area between two desired GPC molecular weight points as described by their retention volumes as follows:

$$ADF_{IR,DV\,or\,LS} = \frac{\sum_{j=RV\,at\,Log(Mgpc)\,of\,Highest\,M\,Desired}^{i=RV\,at\,Log(Mgpc)\,of\,Lowest\,M\,Desired} H_j}{\sum_{j=RV\,at\,Log(Mgpc)\,of\,Highest\,M\,Integrated}^{i=RV\,at\,Log(Mgpc)\,of\,Lowest\,M\,Integrated} H_j}.$$

Therefore, the ADF (ADFIR, ADFDV, and ADFLS) is defined as the area of the integrated chromatogram in "response (intensity) times retention volume," within a desired range of GPC molecular weights, divided by the entire area of the integrated chromatogram. If the desired molecular weight is outside the integrated area of the chromatogram, then any area slices of the desired molecular weight beyond that point is equivalent to zero; thus the ADF numerator represents the intersection of the desired range with the full chromatographic integrated area range. Likewise a plot of a cumulative detector fraction, CDF, versus molecular weight may be obtained by calculating the ADF at each integrated retention volume (i) from the highest molecular weight limit (lowest integrated retention volume) to each integrated retention volume until the lowest molecular weight limit is reached. In such a manner, the CDF can be plotted from 0 to 1 and the area fraction of the desired chromatogram (ADF) can be read as the difference between the two CDF values.

$$CDF_i = \frac{\sum_{j=RV\,at\,Log(Mgpc)\,of\,Highest\,M\,Integrated}^{i=RV\,at\,Log(Mgpc)\,of\,M\,Desired} H_j}{\sum_{j=RV\,at\,Log(Mgpc)\,of\,Highest\,M\,Integrated}^{i=RV\,at\,Log(Mgpc)\,of\,Lowest\,M\,Integrated} H_j}$$

Therefore, the CDFi is the fraction of the total integrated chromatographic area with a GPC molecular weight ≥(or ≤) a desired value expressed as GPC molecular weight. The desired composition has an $ADF_{IR}$ (or ADF IR) at ≤15,000 g/mol GPC molecular weight from 0.200 to 0.250. FIG. 1 shows Inventive Ex. 1 with a value of 0.222. This means that all of the inventive compositions show 20% of the concentration distribution, at molecular weights ≤15,000 g/mol GPC molecular weight, which allows for excellent processibility of the resin within the MI range of interest. An $ADF_{IR} \leq 0.250$ (shown for the inventive polymers) limits the amount of low molecular weight material that may yield problems with "extractables."

Figure 2:
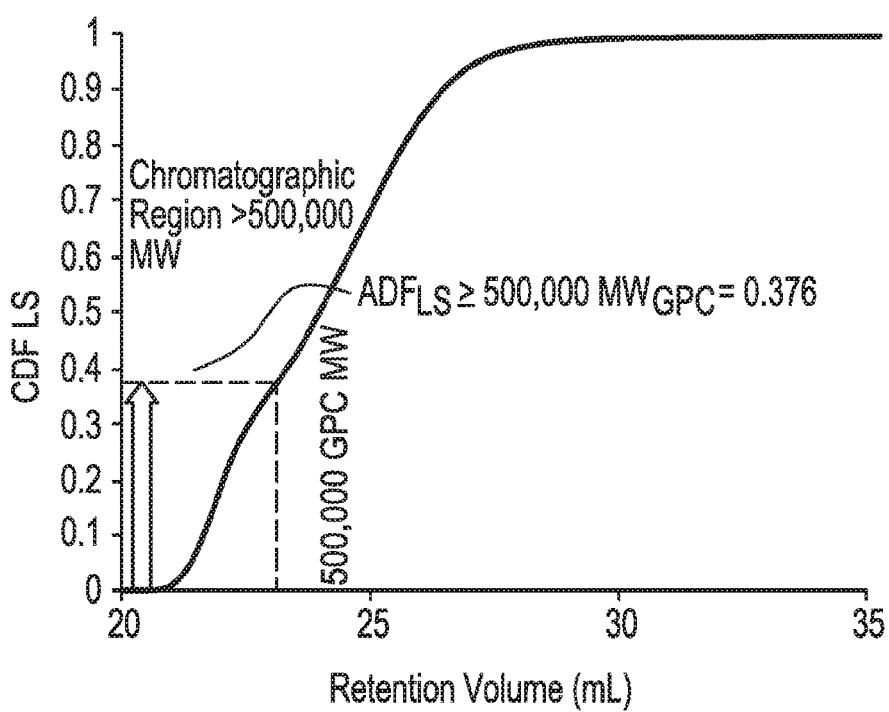
FIG. 2 depicts the "cumulative LS area vs retention volume" for the $CDF_{LS}$ determination of Ex. 1.
Figure 3:
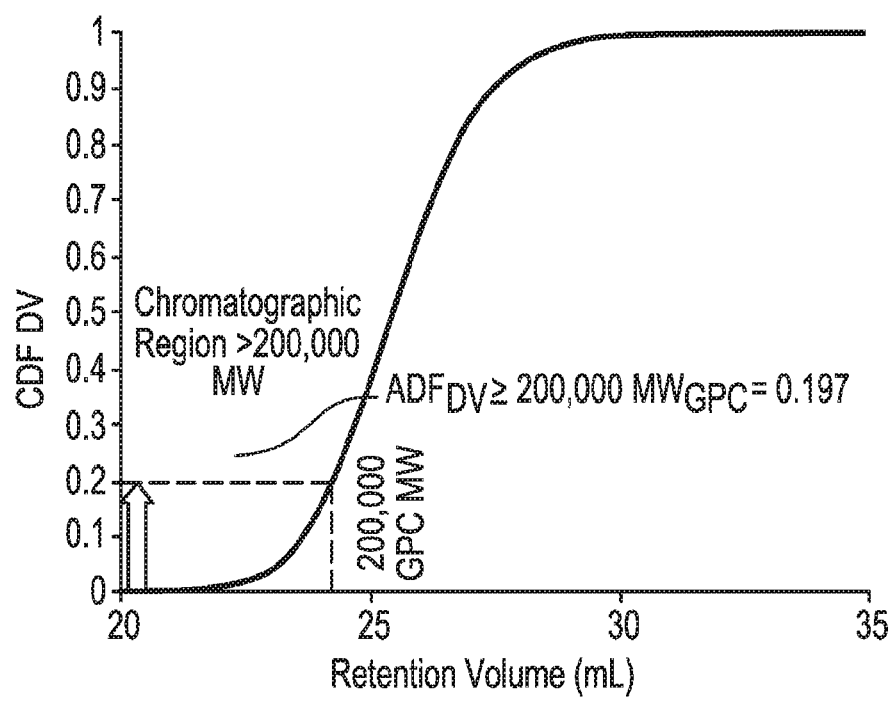
FIG. 3 depicts the "cumulative DV (viscometer) area vs retention volume" for the $CDF_{DV}$ determination of Ex. 1.

The high molecular weight material must furthermore possess enough long-chain branched arms which are detected well by the light scattering detector. We therefore desire a large enough very high molecular weight fraction ($ADF_{LS}$ (or ADF LS) at ≥500,000 g/mol GPC molecular weight of at least 0.350). Thus 35% of the light scattering chromatogram, at molecular weights ≥500,000 g/mol GPC molecular weight, is particularly advantaged. Of note, there is a limit to the amount of very-highly branched material, and it is believed that this material should be kept ≤45% ($ADF_{LS} \leq 0.450$), for molecular weights ≥500,000 g/mol GPC molecular weight, in this particular MI (I2) range (1.5-3.0 g/10 min) to avoid complications with gels, which can impact clarity, surface texture, and drawability. The optimum $ADF_{LS}$, at ≥500,000 g/mol GPC molecular weight, lies from 0.350 to 0.450 (FIG. 2). Inventive Ex. 1 presented in FIG. 2, yields an $ADF_{LS}$ value of 0.376. Moreover, a target range for absolute molecular weight (Mw(abs)) by light scattering, which is indicative of the total backbone and branch molecular weight, lies from 130,000 to 162,000 g/mol. This value can be obtained directly from the concentration-normalized area of the calibrated 15 degree light scattering channel. The intrinsic viscosity (IV) is an indicator of the amount of larger, more-linear chains, and should preferably remain relatively low, less than 0.880 dL/g, or more preferably in the range from 0.820 to 0.880 dL/g (as measured by the inline GPC visco-meter) for optimal processing. Because it is necessary to maintain some long chains to enhance melt strength of a resin, and the viscometer is useful to determine if there is a sufficient presence of such materials, we examine the cumulative detector fraction of the DV at ≥200,000 g/mol GPC molecular weight. This indicates chains that are sufficiently long enough for entanglements but are generally not crosslinked to a degree that may cause optical difficulties. We have found that polymer molecules having an $ADF_{DV}$ (or ADF DV) fraction, at molecular weights ≥200,000 g/mol, of at least 0.180 are sufficient for this criteria (at least 18% of the viscometer chromatogram represents molecular weights ≥200,000 g/mol (GPC molecular weight)) within the MI (I2 melt index) range of interest (FIG. 3). For Inventive Ex. 1, this determination is shown to be 0.197 for ADF DV.

Differential Scanning Calorimetry (DSC)

Differential Scanning Calorimetry (DSC) can be used to measure the melting and crystallization behavior of a polymer over a wide range of temperatures. For example, the TA Instruments Q2000 DSC, equipped with an RCS (refrigerated cooling system) and an autosampler is used to perform this analysis. During testing, a nitrogen purge gas flow of 50 ml/min is used. Each sample is melt pressed into a thin film at about 190° C.; the melted sample is then air-cooled to room temperature (~25° C.). The film sample was formed by pressing a "0.5 to 0.9 gram" sample at 190° C. at 20,000 lbf and 10 seconds, to form a "0.1 to 0.2 mil thick" film. A 3-10 mg, six mm diameter specimen was extracted from the cooled polymer, weighed, placed in an aluminum pan (about 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves are recorded. The cooling curve was analyzed by setting baseline endpoints from the beginning of crystallization to −20° C. The heating curve was analyzed by setting baseline endpoints from −20° C. to the end of melting. The values determined were peak melting temperature (Tm), peak crystallization temperature (Tc), heat of fusion (Hf) (in Joules per gram), and the calculated % crystallinity for ethylene-based polymer samples using the following equations: % Crystallinity=((Hf)/(292 J/g))×100 (EQN 14). The heat of fusion and the peak melting temperature are reported from the second heat curve. The peak crystallization temperature is determined from the cooling curve.

Film Testing

The following physical properties were measured on the films, described in the experimental section. Prior to testing, the film was conditioned for at least 40 hours (after film production) at 23° C. (+/−2° C.) and 50% relative humidity (+/−10% R.H). See Table 12 for the thickness of each film. Total (Overall) Haze and Internal Haze: Internal haze and total haze were measured according to ASTM D 1003. Internal haze was obtained via refractive index matching using mineral oil (1-2 teaspoons), which was applied as a coating on each surface of the film. A Hazegard Plus (BYK-Gardner USA; Columbia, Md.) was used for testing. For each test, 5 samples were examined and an average reported. Sample dimen. were "6 in×6 in." 45° Gloss: ASTM D2457 (average of five film samples; each sample "10 in×10 in"). Clarity: measured using above A Hazegard Plus apparatus (average of five film samples; each sample "10 in×10 in"). Zebedee Clarity: ASTM D1746 using a Zebedee Clarity meter model CL-100 (average of five film samples; each sample "4.5 in×4.5 in"). 2% Secant Modulus-MD (machine direction) and CD (cross direction): ASTM D882 (average of 5 film samples in each direction). 1 inch wide test strips are loaded in a tensile testing frame, using line contact grips at a contact point (gauge length) separation of 4 inches. Samples are tested at a crosshead speed of 2 inches/min up to a nominal stain of 5%. MD and CD Elmendorf Tear Strength: ASTM D1922. The force in grams required to propagate tearing across a film or sheeting specimen is measured using a precisely calibrated pendulum device. Acting by gravity, the pendulum swings through an arc, tearing the specimen from a precut slit. The specimen is held on one side by the pendulum and on the other side by a stationary member. The loss in energy by the pendulum is indicated by a pointer or by an electronic scale. The scale indication is a function of the force required to tear the specimen. The sample used is the 'constant radius geometry' as specified in D1922. Testing would be typically carried out on samples that have been cut from both the MD and CD directions. Prior to testing, the sample thickness is measured at the sample center. A total of 15 specimens per direction are tested, and the average tear strength is reported. Samples that tear at an angle greater than 60° from the vertical are described as 'oblique' tears—such tears should be noted, though the strength values are included in the average strength calculation.

Puncture Strength: Puncture was measured on an INSTRON Model 4201 with SINTECH TESTWORKS SOFTWARE Version 3.10. The specimen size was "6 in×6 in," and 5 measurements were made to determine an average puncture value. A "100 lb load cell" was used with a round specimen holder of 4 inch diameter. The puncture probe was a ½ inch diameter, polished, stainless steel ball on a 0.25 inch diameter support rod with a 7.5 inch maximum travel length. There was no gauge length, and prior to the start of the test, the probe was as close as possible to, but not touching, the specimen. The puncture probe was pushed into the centre of the clamped film at a cross head speed of 10 inches/minute. A single thickness measurement was made in the centre of the specimen. For each specimen, the puncture ((ft·lb$_f$) per in$^3$) was determined. The puncture probe was cleaned using a "KIM-WIPE" after each specimen. "Shrink Force Measurement of Low Shrink Force Films", SPE ANTEC Proceedings, p. 1264 (2008). The shrink tension of the film samples was measured through a temperature ramp test that was conducted on an RSA-III Dynamic Mechanical Analyzer (TA Instruments; New Castle, Del.) with a film fixture. Film specimens of "12.7 mm wide" and "63.5 mm long" were die cut from the film sample, either in the machine direction (MD) or the cross direction (CD), for testing. The film thickness was measured by a Mitutoyo Absolute digimatic indicator (Model C112CEXB). This indicator had a maximum measurement range of 12.7 mm, with a resolution of 0.001 mm. The average of 3 thickness measurements, at different locations on each film specimen, and the width of the specimen, were used to calculate the film's cross sectional area (A), in which "A=Width×Thickness" of the film specimen that was used in shrink film testing. A standard film tension fixture from TA Instruments was used. The oven of the RSA-III was equilibrated at 25° C., for at least 30 minutes, prior to zeroing the gap and the axial force. The initial gap was set to 20 mm. The film specimen was then attached onto both the upper and the lower fixtures. Typically, measurements for MD only require one ply film. Because the shrink tension in the CD direction is typically low, two or four plies of films are stacked together for each mea-surement to improve the signal-to-noise ratio. In such a case, the film thickness is the sum of all of the plies. In this work, a single ply was used in the MD direction and two plies were used in the CD direction. After the film reached the initial temp. of 25° C., the upper fixture was manually raised or lowered slightly to obtain an axial force of −1.0 g. This was to ensure that no buckling or excessive stretching of the film occurred at the beginning of the test. Then the test was started. A constant fixture gap was maintained during the entire measure-ment. The temp. ramp started at a rate of 90° C./min, from 25° C. to 80° C., followed by a rate of 20° C./min, from 80° C. to 160° C. During the ramp from 80° C. to 160° C., as the film shrunk, the shrink force, measured by the force transducer, was recorded as a function of temp. for analysis. The difference between the "peak force" and the "baseline value before the onset of the shrink force peak" is considered the shrink force (F) of the film. The shrink tension of the film is the ratio of the shrink force (F) to the initial cross sectional area (A) of the film.

EXPERIMENTAL

Preparation of Inventive Ethylene-Based Polymers

Figure 4:
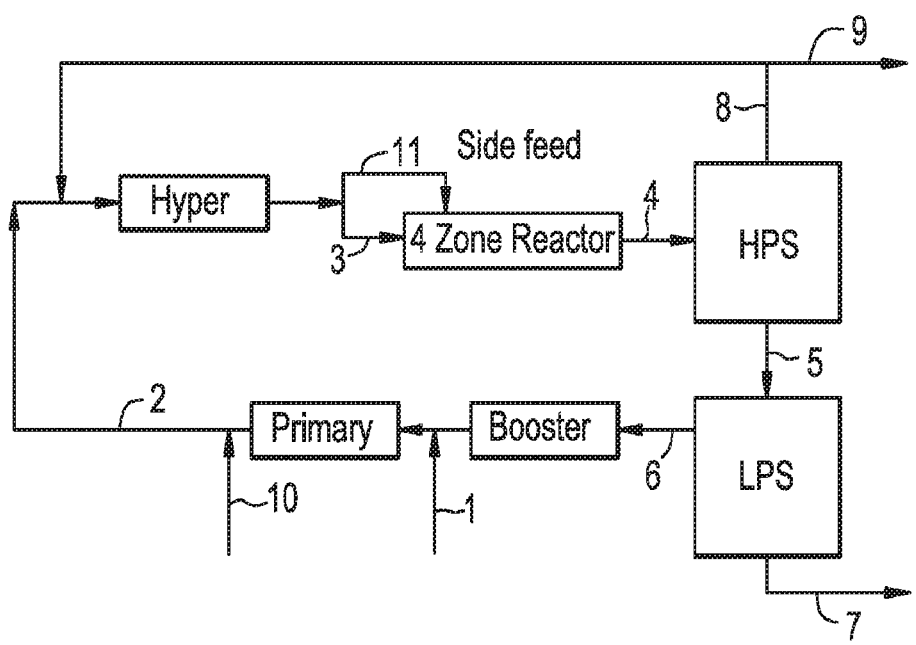
FIG. 4 depicts a block diagram of the polymerization system used to produce the ethylene-based polymer (LDPE) Exs.

FIG. 4 is a block diagram of the process reaction system used to produce the inventive ethylene-based polymers (LDPEs). The process reaction system in FIG. 4 is a partially closed-loop, dual recycle, high-pressure, low density polyethylene production system. The process reaction system is comprised of a fresh ethylene feed line [1], a booster and primary compressor ("Primary"), a hypercompressor ("Hyper") and a four zone tubular reactor ("4 Zone reactor"). Stream [3] is heated by a "Pre-heater" to a sufficiently high temperature, and fed to the front of the reactor. Stream [11] is fed as a side stream to the reactor. In the reactor, polymerization is initiated with the help of four mixtures, each containing one or more free radical initiation systems (see Table 1), which are injected at the inlet of each reaction zone (not shown).

The maximum temperature in each reaction zone is controlled at a set point, by regulating the feed amount of the mixture of initiators at the start of each reaction zone. Each reaction zone has one inlet and one outlet. Each inlet stream consists of the outlet stream from the previous zone and/or added ethylene-rich feed stream. Upon completing the polymerization, the reaction mixture is depressurized and cooled in stream [4]. The process further consists of a high pressure separator "HPS," which separates the reaction mixture into an ethylene rich stream [8], which is cooled and recycled back to the suction of the hyper, and a polymer rich stream [5], which is sent to the low pressure separator "LPS" for further separation. In the LPS, the ethylene rich stream is cooled, and recycled back to the booster ("Booster") in stream [6]. From the booster, the ethylene is compressed further by the primary compressor. Feed [2] is then recycled by to the suction of the hypercompressor. The polymer leaving the LPS [7] is further pelletized and purged. The chain transfer agent "CTA" feed [10] is injected into the ethylene stream at the discharge of the primary compressor. Stream [9] is a purge stream used to remove impurities and/or inerts. Cooling jackets (using high pressure water) are mounted around the outer shell of the tube reactor and pre-heater. For Inventive Exs 1-2, a mixture containing t-butyl peroxy-2 ethylhexanoate (TBPO), tert-butyl peroxyacetate (TBPA), and an iso-paraffinic hydrocarbon solvent (boiling range 171-191° C.; for example, ISOPAR H) was used as the initiator mixture for the first reaction zone. For the second reaction zone, a mixture containing di-tert-butyl peroxide (DTBP), TBPO, TBPA, and the iso-paraffinic hydrocarbon solvent was used. For the third and fourth reaction zones, a mixture of TBPA, DTBP, and iso-paraffinic hydrocarbon solvent was used. This data is summarized in Table 1. 1-Butene was used as the CTA. The concentration of the CTA fed to the process was adjusted to control the melt index of the product. Table 2 shows that the polymerization conditions used to form Exs. 1 and 2.

TABLE 1

Peroxide initiator flows, in pounds per hour, at each injection point, for Exs 1 and 2

| Injection Point | Initiator | Ex. 1: Neat PO lbs/hour | Ex. 2: Neat PO lbs/hour |
|---|---|---|---|
| #1 | TBPO | 1.87 | 1.80 |
| #1 | TBPA | 0.80 | 0.77 |
| #2 | TBPO | 5.4 | 5.20 |
| #2 | TBPA | 1.16 | 1.11 |
| #2 | DTBP | 1.16 | 1.11 |
| #3 | TBPA | 0 | 0 |
| #3 | DTBP | 0 | 0 |
| #4 | TBPA | 3.04 | 3.10 |
| #4 | DTBP | 7.10 | 7.24 |

TABLE 2

Process conditions

| | Example 1 | Example 2 |
|---|---|---|
| Reactor Pressure (Psig) | 38,718 | 38,898 |
| Zone 1 Initiation T (° C.) | 146.5 | 148.7 |
| Zone 1 Peak T (° C.) | 251.6 | 247.0 |
| Zone 2 Initiation T (° C.) | 163.6 | 168.6 |
| Zone 2 Peak T (° C.) | 288.7 | 286.6 |
| Zone 3 Initiation T (° C.) | 246.4 | 246.2 |
| Zone 3 Peak T (° C.) | 240.2 | 239.2 |
| Zone 4 Initiation T (° C.) | 196.3 | 191.9 |
| Zone 4 Peak T (° C.) | 283.2 | 281.0 |
| Fresh ethylene Flow (lb/hr) | 23,840 | 25,332 |
| Ethylene Throughput to Reactor (lb/hr) | 100,480 | 100,600 |
| Ethylene Conversion (%) | 23.7 | 24.2 |
| Butene Flow (lb/hr) | 223 | 245 |
| Ethylene Purge Flow (lb/hr) | 509 | 505 |
| Recycle Butene Conc. (% Vol) | 0.54 | 0.59 |
| Pre-heater T (° C.) | 200.3 | 200.3 |
| Reactor Cooling System 1 (° C.) | 168.4 | 167.9 |
| Reactor Cooling System 2 (° C.) | 176.8 | 176.5 |

Figure 5:
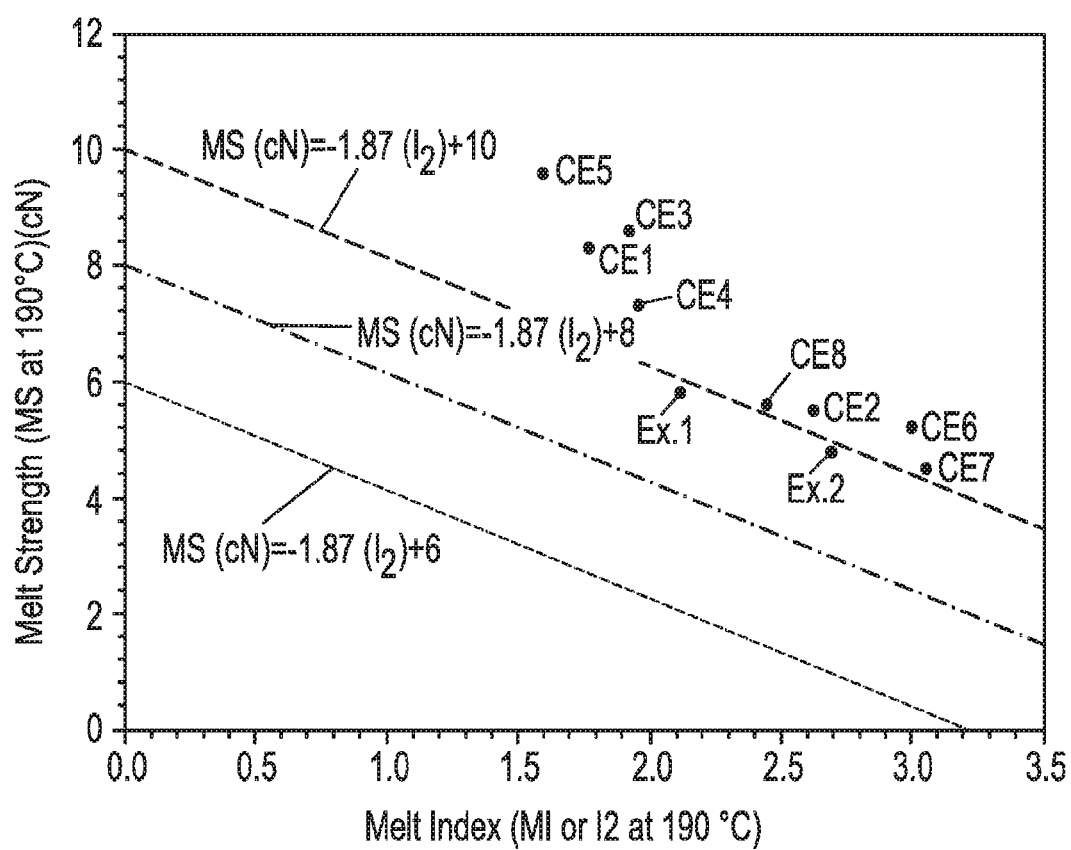
FIG. 5 depicts the melt strength as a function of the melt index for the inv. exs and comp. exs.

Properties of Inv. Exs. and Comp. Exs. are listed in Tables 3-10. Table 3 contains the melt index (I2 or MI), density, % hexane extractables, melt strength, and velocity at break of the melt strength data. Inventive Ex. are in the range of 2 to 3 melt index with the highest density of any of samples at 0.925 g/cc, indicating that these LDPE resins would have improved stiffness. Additionally, the hexane extractables of the Inventive Exs are very low, at 0.9-1.0 wt %, indicating less material which could extract from the LDPE upon use. The melt strength of the Inventive Exs. are relatively low as shown in FIG. 5 and have a melt strength at 190° C. of $<-1.87*(I_2$ at 190° C.)+10 cN. Additionally, the velocity at break of the Inventive Exs are high indicating good drawability and extrusion behavior. Tables 4 through Table 6 contain the TDGPC data for the Inventive exs and the comparative polymers. Table 4 contains the conventional GPC (conv) data which illustrates the moderately broad molecular weight distributions described by the moderately broad Mw(conv)/Mn(conv) ratio, coupled with a moderately high z-average molecular weight, Mz(conv), while possessing a lower weight-average molecular weight, Mw(conv), all of which contribute to a good balance of melt strength and output on blown film lines, as seen with these inventive polymers. Table 5 contains the TDGPC-related properties derived from the LS and viscosity detectors, in conjunction with the concentration detector. As seen in Table 5, it has been discovered that the inventive polymers have higher Mz(abs)/Mw(abs) ratio coupled with a relatively low Mw(abs). Furthermore, the LCBf and gpcBR values highlight that the inventive resins have a relatively low amount of long-chain branches, and therefore possess a more "open structure" allowing the high molecular weight Mz(abs)

molecules more of an opportunity to interpenetrate and develop melt strength effectively.

Table 6 contains characteristics of the triple detector chromatograms, including the low molecular weight tail (defines by $ADF_{IR}$) which aids in processing, an effective amount of high molecular weight branched species, characterized by a moderate $ADF_{LS}$ value, and a very low portion of the specific viscosity chromatogram ($ADF_{DV}$) which would be dominated by high MW linear species (higher viscosity and lower melt strength). This is accentuated by the total area of the specific viscosity chromatogram from which intrinsic viscosity (IV (Abs)) is calculated, which is characteristically low for these polymers. It is the balance of the low viscosity, IV (Abs), particularly across the high MW region, $ADF_{DV}$, which allows for excellent processing while still maintaining a desirable level of the aforementioned characteristics (Table 5 and $ADF_{LS}$) which produce good melt strength and is characteristic of the inventive exs. Table 7 contains the DMS viscosity data, as summarized by the viscosities measured at 0.1, 1, 10, and 100 rad/s, the viscosity ratio, or the ratio of viscosity measured at 0.1 rad/s to the viscosity measured at 100 rad/s, all being measured at 190° C., and the tan delta measured at 0.1 rad/s and 190° C. The viscosity ratio, which reflects the change in viscosity with frequency, is relatively low for the inventive polymers. The tan delta, at 0.1 rad/s, values of the inventive polymers are relatively high, indicative of low melt elasticity or melt strength. Table 8 contains the branches per 1000 total carbons as measured by $^{13}C$ NMR. These LDPE polymers contain amyl, or C5 branches, which are not contained in substantially linear polyethylenes, such as AFFINITY Polyolefin Plastomers, or the LLDPEs, such as DOWLEX Polyethylene Resins, both produced by The Dow Chemical Company. Each inventive and comparative LDPE, shown in Table 8, contains greater than, or equal to, 0.5 amyl groups (branches) per 1000 total carbon atoms (the Inventive Exs contain greater than 1 amyl groups (branches) per 1000 total carbon atoms). The Inventive Exs contain relatively no detectable C1 per 1000 total carbon atoms. Table 9 contains unsaturation results by $^1HNMR$. Table 10 contains the DSC results of the melting point, $T_m$, the heat of fusion, the percent crystallinity, and the crystallization point, $T_c$.

TABLE 3

Melt index ($I_2$), density, % hexane extractables, melt strength (MS) at 190° C., and the velocity (V) at break of melt strength of Examples (Ex.) and Comparative Examples (CE)

| Polymer | $I_2$ (g/10 min) | Den. (g/cc) | Hexane Ext. (%) | MS (cN) | V at Break (mm/s) |
|---|---|---|---|---|---|
| LDPE 1 (Ex. 1) | 2.12 | 0.9250 | 0.96 | 5.8 | 341 |
| LDPE 2 (Ex. 2) | 2.69 | 0.9250 | 0.99 | 4.8 | 343 |
| LDPE 535I* (CE 1) | 1.77 | 0.9249 | 1.37 | 8.3 | 303 |
| LDPE 608A* (CE 2) | 2.63 | 0.9236 | 1.55 | 5.5 | 338 |
| LDPE 640I* (CE 3) | 1.93 | 0.9195 | 2.32 | 8.6 | 275 |
| LDPE 501I* (CE 4) | 1.96 | 0.9206 | 1.84 | 7.3 | 273 |
| AGILITY 1021* (CE 5) | 1.60 | 0.9194 | 2.33 | 9.6 | 252 |
| LDPE 586A* (CE 6) | 3.00 | 0.9211 | 2.14 | 5.2 | 317 |
| LDPE 525E* (CE 7) | 3.06 | 0.9300 | 1.01 | 4.5 | 339 |
| Braskem EB853/72** (CE 8) | 2.45 | 0.9210 | 1.93 | 5.6 | 406 |

*Available from The Dow Chemical Company.
**Available from Braskem.

TABLE 4

Conventional GPC properties of Examples (Ex.) and Comparative Examples (CE)

| | Mn(conv) (g/mol) | Mw(conv) (g/mol) | Mz(conv) (g/mol) | Mw(conv)/Mn(conv) |
|---|---|---|---|---|
| Ex. 1 | 15,600 | 81,100 | 283,000 | 5.18 |
| Ex. 2 | 15,400 | 79,300 | 282,000 | 5.16 |
| CE 1 | 14,100 | 99,400 | 376,000 | 7.06 |
| CE 2 | 17,100 | 89,400 | 299,000 | 5.21 |
| CE 3 | 15,500 | 93,500 | 323,000 | 6.03 |
| CE 4 | 14,700 | 90,900 | 382,000 | 6.20 |
| CE 5 | 12,900 | 101,000 | 448,000 | 7.81 |
| CE 6 | 15,700 | 78,900 | 318,000 | 5.03 |
| CE 7 | 17,600 | 78,800 | 271,000 | 4.48 |
| CE 8 | 17,700 | 80,900 | 224,000 | 4.57 |

TABLE 5

Absolute GPC calibration of Examples (Ex.) and Comparative Examples (CE).

| | Mw(abs) (g/mol) | Mz(abs) (g/mol) | Mz(abs)/ Mw(abs) | Mw(abs)/ Mw(conv) | LCBf | gpcBR |
|---|---|---|---|---|---|---|
| Ex. 1 | 152,000 | 3,250,000 | 21.4 | 1.87 | 1.42 | 1.54 |
| Ex. 2 | 150,000 | 3,280,000 | 21.9 | 1.89 | 1.47 | 1.56 |
| CE 1 | 214,000 | 3,990,000 | 18.6 | 2.16 | 2.09 | 2.05 |
| CE 2 | 175,000 | 3,280,000 | 18.7 | 1.96 | 1.85 | 1.74 |
| CE 3 | 181,000 | 2,400,000 | 13.2 | 1.94 | 1.49 | 1.77 |
| CE 4 | 204,000 | 4,160,000 | 20.3 | 2.25 | 1.69 | 2.02 |
| CE 5 | 246,000 | 4,530,000 | 18.4 | 2.44 | 2.53 | 2.36 |
| CE 6 | 166,000 | 3,740,000 | 22.5 | 2.10 | 1.24 | 1.73 |
| CE 7 | 162,000 | 2,510,000 | 15.5 | 2.06 | 1.97 | 1.67 |
| CE 8 | 139,800 | 1,530,000 | 10.9 | 1.72 | 2.39 | 1.35 |

TABLE 6

TDGPC properties (IR, LS, and DV) of Examples (Ex.) and CE

| | $ADF_{IR}$ (MW ≤ 15,000 g/mol) | $ADF_{LS}$ (MW ≥ 500,000 g/mol) | $ADF_{DV}$ (MW ≥ 200,000 g/mol) | IV (Abs) (g/dl) |
|---|---|---|---|---|
| Ex. 1 | 0.222 | 0.376 | 0.197 | 0.867 |
| Ex. 2 | 0.225 | 0.381 | 0.189 | 0.851 |
| CE 1 | 0.240 | 0.480 | 0.293 | 0.911 |
| CE 2 | 0.219 | 0.395 | 0.240 | 0.890 |
| CE 3 | 0.204 | 0.350 | 0.250 | 0.903 |
| CE 4 | 0.236 | 0.478 | 0.267 | 0.888 |
| CE 5 | 0.253 | 0.529 | 0.326 | 0.900 |
| CE 6 | 0.246 | 0.422 | 0.226 | 0.858 |
| CE 7 | 0.218 | 0.413 | 0.224 | 0.878 |
| CE 8 | 0.218 | 0.259 | 0.242 | 0.890 |

TABLE 7

Viscosities in Pa · s at 0.1, 1, 10, and 100 rad/s, viscosity ratio, and the tan delta at 190° C.

| | Visc 0.1 rad/s | Visc 1 rad/s | Visc 10 rad/s | Visc 100 rad/s | Visc. Ratio V0.1/V100 | Tan Delta 0.1 rad/s |
|---|---|---|---|---|---|---|
| Ex. 1 | 6,468 | 4,166 | 1,750 | 540 | 11.99 | 5.47 |
| Ex. 2 | 5,096 | 3,474 | 1,530 | 491 | 10.38 | 6.58 |
| CE 1 | 8,849 | 4,788 | 1,780 | 507 | 17.45 | 3.47 |
| CE 2 | 5,557 | 3,534 | 1,477 | 456 | 12.19 | 5.53 |
| CE 3 | 6,436 | 4,156 | 1,763 | 536 | 12.00 | 5.34 |
| CE 4 | 7,446 | 4,282 | 1,657 | 487 | 15.30 | 4.12 |
| CE 5 | 9,346 | 4,721 | 1,662 | 463 | 20.18 | 2.94 |
| CE 6 | 4,955 | 3,221 | 1,366 | 427 | 11.60 | 5.78 |
| CE 7 | 4,412 | 3,025 | 1,375 | 456 | 9.67 | 6.71 |
| CE 8 | 5,646 | 3,548 | 1,439 | 434 | 13.00 | 5.33 |

TABLE 8

Branches per 1000 C by $^{13}$C NMR of Examples and Comparative Examples

| | C1 | Isolated C2 from butene | 1,3 diethyl branches | C2 on Quat Carbon | C4 | C5 | C6+ |
|---|---|---|---|---|---|---|---|
| Ex. 1 | ND* | 1.36 | 2.61 | 0.72 | 5.24 | 1.91 | 2.7 |
| Ex. 2 | ND | 1.54 | 2.69 | 0.94 | 5.30 | 1.65 | 2.4 |
| CE 1 | ND | ND | 2.69 | 0.93 | 5.92 | 1.91 | 3.2 |
| CE 2 | ND | 1.41 | 2.88 | 1.17 | 5.68 | 1.76 | 2.9 |
| CE 3 | ND | ND | 4.78 | 1.91 | 6.69 | 2.24 | 3.2 |
| CE 4 | 4.09 | ND | 2.99 | 0.88 | 5.63 | 1.88 | 3.0 |
| CE 5 | 2.30 | ND | 4.03 | 1.51 | 6.63 | 1.90 | 3.3 |
| CE 6 | 4.42 | ND | 3.29 | 1.08 | 5.56 | 1.81 | 2.9 |
| CE 7 | ND | ND | 2.17 | 0.98 | 4.50 | 1.52 | 2.8 |
| CE 8 | ND | 1.25 | 3.77 | 1.43 | 6.44 | 2.49 | 3.7 |

*Not detected.

TABLE 9

Unsaturation Results by $^1$H NMR of Examples and Comparative Examples

| | vinyl/ 1000 C | cis and trans/ 1000 C | trisub/ 1000 C | vinylidene/ 1000 C | total unsaturation/1000 C |
|---|---|---|---|---|---|
| Ex. 1 | 0.106 | 0.202 | 0.057 | 0.091 | 0.46 |
| Ex. 2 | 0.110 | 0.218 | 0.066 | 0.091 | 0.49 |
| CE 1 | 0.032 | 0.022 | 0.038 | 0.116 | 0.21 |
| CE 2 | 0.123 | 0.177 | 0.065 | 0.117 | 0.48 |
| CE 3 | 0.058 | 0.062 | 0.115 | 0.269 | 0.50 |
| CE 4 | 0.251 | 0.048 | 0.048 | 0.122 | 0.47 |
| CE 5 | 0.162 | 0.056 | 0.056 | 0.174 | 0.45 |
| CE 6 | 0.297 | 0.094 | 0.072 | 0.132 | 0.59 |
| CE 7 | 0.026 | 0.018 | 0.031 | 0.081 | 0.16 |
| CE 8 | 0.121 | 0.213 | 0.090 | 0.136 | 0.56 |

TABLE 10

DSC results of Examples and Comparative Examples

| Sample | $T_m$ (° C.) | Heat of Fusion (J/g) | % Crystallinity | $T_c$ (° C.) |
|---|---|---|---|---|
| Ex. 1 | 112.0 | 154.5 | 52.9 | 100.8 |
| Ex. 2 | 112.0 | 153.0 | 52.4 | 100.8 |
| CE 1 | 112.0 | 150.4 | 51.5 | 100.9 |
| CE 2 | 110.3 | 146.1 | 50.0 | 98.8 |
| CE 3 | 110.0 | 134.9 | 46.2 | 96.8 |
| CE 4 | 108.5 | 140.3 | 48.0 | 96.4 |
| CE 5 | 108.3 | 136.2 | 46.6 | 95.9 |
| CE 6 | 108.2 | 145.3 | 49.8 | 95.8 |
| CE 7 | 115.4 | 169.2 | 57.9 | 103.1 |
| CE 8 | 109.1 | 149.5 | 51.2 | 97.7 |

Blown films were made, and physical properties measured, with different LDPEs. Films were made at 100 wt % LDPE. The monolayer blown films were made on an "8 inch die" with a polyethylene "Davis Standard Barrier II screw." External cooling by an air ring and internal bubble cooling were used. General blown film parameters, used to produce each blown film, are shown in Table 11. The temperatures are the temperatures closest to the pellet hopper (Barrel 1), and in increasing order, as the polymer was extruded through the die.

TABLE 11

Blown film fabrication conditions for films.

| | |
|---|---|
| Blow up ratio (BUR)/Film thickness (mil)/Die gap (mil)/Air temp. (° F.) | 2.5/2.0/40/45 |
| Temperature profile (° F.) | |
| Barrel 1/Barrel 2/Barrel 3/Barrel 4/Barrel 5 | 350/415/365/305/305 |
| Screen Temperature | 410 |
| Adapter/Block/Lower Die/Inner Die/Upper Die | 410/430/440/440/440 |

Film properties are shown in Table 12. The inventive samples have good haze, gloss, and clarity as desired and high 2% MD Secant Modulus, reflecting good stiffness. The inventive compositions provide the proper balance of ADF IR value, molecular weight distribution and melt index (I2), and process well into useful blown films and shrink films. If the ADF LS value of the ethylene-based polymer is <0.350 (see Film 10), for the claimed I2 ranges, we see a decrease in CD shrink tension and a decreased puncture resistance. If the ADF LS value of the ethylene-based polymer is >0.450, the polymer will have too much high molecular weight content, which typically results in increase in gel levels, and poorer optics (reduced gloss). If the Mw(abs) is <130,000 g/mol, typically a decrease in melt strength results, leading to reduced bubble strength. If the Mw(abs) is >162,000 g/mol, too much high molecular weight content results, which can lead reduced modulus, and decreases in CD Shrink Tension (or stiffness—see Films 4, 5 and 8) and/or undesirable crystallization or orientation in the film product. If the I2 value of the polymer is <1.5, it is typically more difficult to extrude the polymer into a blown film, and typically poor optics (increased haze and reduced gloss) result in the film product. If the I2 value of the polymer is >3.0, this will typically result in a lower shrink tension in the final film, and thus, results in an increased relaxation in the film, and a loss in package tightness around contained goods. See Film 9—a decease in CD Shrink Tension, a decease in puncture resistance, and an increase in haze (poor optics).

TABLE 12

Film properties of "100% LDPE" Film #1-10, each made at 2.0 mil (±0.3) at a standard (std.) rate of approximately 250 lb/hr.

| | Film | | | | | | | | | |
|---|---|---|---|---|---|---|---|---|---|---|
| | 1 | 2 | 3 | 4 | 5 | 6 | 7 | 8 | 9 | 10 |
| | | | | | LDPE | | | | | |
| | Ex. 1 | Ex. 2 | CE 1 | CE2 | CE 3 | CE 4 | CE 5 | CE 6 | CE 7 | CE 8 |
| Thickness (mil) | 1.96 | 1.74 | 1.78 | 2.01 | 1.96 | 2.04 | 2.09 | 1.98 | 1.87 | 2.01 |
| Haze (%) | 7.9 | 8.3 | 8.1 | 7.7 | 7.3 | 7.8 | 8.1 | 8.2 | 10.7 | 7.7 |
| Haze Internal (%) | 3.6 | 3.9 | 2.9 | 3.4 | 2.9 | 2.7 | 2.1 | 3.5 | 5.0 | 3.3 |
| Gloss (20°) | 88.0 | 96.7 | 71.9 | 95.0 | 68.1 | 73.2 | 51.7 | 76.9 | 81.6 | 92.2 |
| Gloss (45°) | 74.6 | 73.3 | 70.2 | 74.6 | 73.4 | 71.8 | 65.8 | 71.8 | 66.7 | 74.6 |

TABLE 12-continued

Film properties of "100% LDPE" Film #1-10, each made at 2.0 mil (±0.3) at a standard (std.) rate of approximately 250 lb/hr.

| | Film | | | | | | | | | |
|---|---|---|---|---|---|---|---|---|---|---|
| | 1 | 2 | 3 | 4 | 5 | 6 | 7 | 8 | 9 | 10 |
| | | | | | LDPE | | | | | |
| | Ex. 1 | Ex. 2 | CE 1 | CE2 | CE 3 | CE 4 | CE 5 | CE 6 | CE 7 | CE 8 |
| Gloss (60°) | 116.0 | 118.2 | 104.5 | 117.6 | 109.2 | 104.9 | 93.5 | 111.4 | 108.8 | 118.6 |
| Clarity (%) | 97.8 | 98.7 | 96.4 | 98.2 | 95.5 | 94.5 | 93.8 | 95.4 | 97.8 | 97.4 |
| Clarity, Zebedee (%) | 64.0 | 76.4 | 62.3 | 71.2 | 60.3 | 45.8 | 48.8 | 57.4 | 64.7 | 64.1 |
| Puncture (ft-lb/in$^3$) | 40.4 | 32.8 | 45.5 | 13.7 | 50.9 | 27.5 | 40.3 | 24.2 | 17.8 | 13.6 |
| MD Tear (g) | 400 | 452 | 536 | 478 | 453 | 437 | 498 | 443 | 95 | 504 |
| CD Tear (g) | 452 | 424 | 452 | 392 | 341 | 366 | 344 | 377 | 250 | 402 |
| MD Normalized Tear (g/mil) | 201 | 228 | 267 | 231 | 220 | 211 | 239 | 222 | 46 | 252 |
| CD Normalized Tear (g/mil) | 224 | 210 | 217 | 188 | 169 | 176 | 169 | 187 | 125 | 194 |
| MD/CD Normalized Tear | 0.90 | 1.08 | 1.23 | 1.23 | 1.30 | 1.20 | 1.42 | 1.19 | 0.37 | 1.30 |
| 2% MD Secant Modulus (psi) | 32,021 | 31,050 | 31,428 | 27,389 | 24,344 | 26,794 | 25,060 | 23,632 | 41,806 | 26,326 |
| 2% CD Secant Modulus (psi) | 34,951 | 33,258 | 34,737 | 30,930 | 28,293 | 29,497 | 27,823 | 26,914 | 46,114 | 28,596 |
| MD Shrink Tension (psi) | 5.70 | 4.81 | 8.04 | 6.48 | 10.59 | 9.61 | 10.05 | 6.57 | 3.52 | 7.28 |
| CD Shrink Tension (psi) | 1.17 | 1.06 | 1.01 | 0.87 | 0.75 | 0.75 | 0.56 | 0.54 | 0.75 | 0.72 |
| MD/CD Shrink Tension ratio | 4.9 | 4.5 | 8.0 | 7.4 | 14.2 | 12.8 | 17.9 | 12.2 | 4.7 | 10.1 |
| Frost Line Height (inches) | 45 | 45 | 45 | 45 | 45 | 45 | 45 | 45 | 45 | 45 |
| Melt Temperature (° F.) | 386 | 384 | 387 | 384 | 389 | 384 | 382 | 376 | 382 | 381 |
| Head Pressure (psi) | 2,103 | 1,975 | 1,966 | 2,000 | 2,299 | 1,959 | 1,976 | 1,749 | 1,728 | 1,983 |
| Standard output (lb/hr) | 259 | 260 | 258 | 260 | 260 | 259 | 261 | 261 | 259 | 262 |
| Die Gap (mil) | 40 | 40 | 40 | 40 | 40 | 40 | 40 | 40 | 40 | 40 |

The invention claimed is:

1. A composition comprising an ethylene-based polymer, wherein the ethylene-based polymer comprises the following properties:
   a) an Mw(abs) from 130,000 to 162,000 g/mol;
   b) a melt index (I2) from 1.5 to 3.0 g/10 min; and
   c) an ADF LS from 0.350 to 0.450 for molecular weight ≥500,000 g/mol.

2. The composition of claim 1, wherein the ethylene-based polymer further comprises an ADF IR from 0.200 to 0.250 for molecular weight ≤15,000 g/mol.

3. The composition of claim 1, wherein the ethylene-based polymer further comprises an ADF DV from 0.180 to 0.240 for molecular weight ≥200,000 g/mol.

4. The composition of claim 1, wherein the ethylene-based polymer further comprises an ADF DV ≤0.210 for molecular weight ≥200,000 g/mol.

5. The composition of claim 1, wherein the ethylene-based polymer has a density is from 0.923 to 0.927 g/cc (1 cc=1 cm$^3$).

6. The composition of claim 1, wherein the ethylene-based polymer is an LDPE.

7. The composition of claim 1, wherein the composition comprises a second ethylene-based polymer.

8. An article comprising at least one component formed from the composition of claim 1.

9. A film comprising the composition of claim 1, wherein the film has a 45° gloss >72% and a 2% MD secant modulus >30,000 psi for a 2.0±0.3 mil film thickness.

10. A film comprising the composition of claim 1, wherein the film has a ratio of MD shrink tension to CD shrink tension of less than 7.0 and a CD shrink tension greater than 0.9, each for a 2.0±0.3 mil film thickness.

* * * * *